US010005513B2

(12) United States Patent
Kosaka et al.

(10) Patent No.: US 10,005,513 B2
(45) Date of Patent: Jun. 26, 2018

(54) BICYCLE OPERATING DEVICE

(71) Applicant: Shimano Inc., Sakai, Osaka (JP)

(72) Inventors: Kentaro Kosaka, Osaka (JP);
Yoshimitsu Miki, Osaka (JP);
Kazunori Okubo, Osaka (JP)

(73) Assignee: Shimano Inc., Osaka (JP)

( * ) Notice: Subject to any disclaimer, the term of this patent is extended or adjusted under 35 U.S.C. 154(b) by 9 days.

(21) Appl. No.: 14/791,689

(22) Filed: Jul. 6, 2015

(65) Prior Publication Data
US 2017/0008599 A1  Jan. 12, 2017

(51) Int. Cl.
F16C 1/12     (2006.01)
B62K 23/06    (2006.01)
G05G 5/18     (2006.01)
B62M 25/04    (2006.01)

(52) U.S. Cl.
CPC ............. B62K 23/06 (2013.01); B62M 25/04 (2013.01); G05G 5/18 (2013.01)

(58) Field of Classification Search
CPC .......... B62K 23/06; G05G 5/18; B62M 25/04
See application file for complete search history.

(56) References Cited

U.S. PATENT DOCUMENTS

| 8,016,705 | B2 | 9/2011 | Takachi |  |
|---|---|---|---|---|
| 8,777,788 | B2 | 7/2014 | Kawakami et al. |  |
| 2010/0071499 | A1* | 3/2010 | Weiss | B62K 23/06 74/502.2 |
| 2011/0079103 | A1* | 4/2011 | Kususe | B60T 7/102 74/502.2 |
| 2012/0297919 | A1 | 11/2012 | Fukao et al. |  |
| 2013/0081506 | A1* | 4/2013 | Fukao | B62M 25/04 74/502.2 |

* cited by examiner

Primary Examiner — Vicky A Johnson
(74) Attorney, Agent, or Firm — Global IP Counselors, LLP

(57) ABSTRACT

A bicycle operating device includes a bicycle component positioning unit that basically includes a positioning structure and a maintaining member. The positioning structure is configured to be movable in a first direction and a second direction that is opposite the first direction. The maintaining member is configured to move between a first position that maintains the positioning structure in one of a plurality of predetermined positions and a second position that releases the positioning structure to move to another one of the predetermined positions. The maintaining member contacts the positioning structure. The positioning structure and the maintaining member are configured such that the maintaining member applies a rotating force on the positioning structure in the first direction as the maintaining member moves from the second position to the first position.

14 Claims, 21 Drawing Sheets

BICYCLE OPERATING DEVICE

BACKGROUND

Field of the Invention

This invention generally relates to a bicycle operating device. More specifically, the present invention relates to a bicycle operating device which is used to selectively position a bicycle component in at least two positions.

Background Information

Many bicycles have bicycle components that are moved between various positions. For example, a gear shift operating device (bicycle shifter) is one example of a bicycle component operating device. In this type of gear shift operating device, a bicycle component positioning unit is often provided for controlling a shifting device for changing speed stages. The gear shift operating device is connected to the shifting device with, for example, a Bowden-type gear shift cable. The gear shift operating device is configured and arranged to allow a user to operate the shifting device by operating, for example, a lever or other such operating member of the gear shift operating device. One example of a bicycle operating device (bicycle shifter) is disclosed in U.S. Patent Application Publication No. 2012/0297919A1, which is assigned to Shimano Inc.

In addition to gear shift operating device, other bicycle components are also provided with a bicycle component positioning unit. For example, a shifting device such as a derailleur can be provided with a bicycle operating device including a bicycle component positioning unit as disclosed in U.S. Pat. No. 8,777,788, which is assigned to Shimano Inc.

SUMMARY

Generally, the present disclosure is directed to various features of a bicycle operating device.

In view of the state of the known technology and in accordance with a first aspect of the present disclosure, a bicycle operating device is provided that basically comprises a positioning structure and a maintaining member. The positioning structure is configured to be movable in a first direction and a second direction that is opposite the first direction. The maintaining member is configured to move between a first position that maintains the positioning structure in one of a plurality of predetermined positions and a second position that releases the positioning structure to move to another one of the predetermined positions. The maintaining member contacts the positioning structure. The positioning structure and the maintaining member are configured such that the maintaining member applies a rotating force on the positioning structure in the first direction as the maintaining member moves from the second position to the first position.

In accordance with a second aspect of the present invention, the bicycle operating device according to the first aspect is configured so that the positioning structure is arranged to rotate about a rotational axis.

In accordance with a third aspect of the present invention, the bicycle operating device according to the second aspect is configured so that the positioning structure includes a plurality of positioning teeth defining the predetermined positions. The maintaining member includes a maintaining tooth that selectively engages the positioning teeth to establish the predetermined positions. The maintaining member is biased such that the maintaining tooth contacts the positioning structure.

In accordance with a fourth aspect of the present invention, the bicycle operating device according to the third aspect is configured so that at least one of the positioning teeth includes a contact surface. The maintaining tooth rides along the contact surface such that the maintaining tooth applies the rotating force on the positioning structure in the first direction as the maintaining member moves from the second position to the first position.

In accordance with a fifth aspect of the present invention, the bicycle operating device according to the fourth aspect is configured so that the contact surface is configured to be substantially flat.

In accordance with a sixth aspect of the present invention, the bicycle operating device according to the fifth aspect is configured so that the at least one of the positioning teeth includes a top portion. The contact surface is arranged at a second direction side with respect to the top portion. The contact surface has a slant angle with respect to a line extending from the rotational axis to the top portion between five degrees and sixty degrees.

In accordance with a seventh aspect of the present invention, the bicycle operating device according to the fourth aspect is configured so that the at least one of the positioning teeth includes a top portion. The contact surface is arranged at a second direction side with respect to the top portion. The contact surface has a contact angle between one degree and six degree around the rotational axis.

In accordance with an eighth aspect of the present invention, the bicycle operating device according to the seventh aspect is configured so that the contact surface is configured to be substantially flat.

In accordance with a ninth aspect of the present invention, the bicycle operating device according to the fourth aspect is configured so that the at least one of the positioning teeth includes a protrusion projecting in the second direction with respect to the rotational axis. The contact surface is provided on the protrusion.

In accordance with a tenth aspect of the present invention, the bicycle operating device according to the ninth aspect is configured so that the maintaining tooth includes a recess, and the protrusion is configured to be disposed in the recess of the maintaining tooth while the maintaining member is in the first position.

In accordance with an eleventh aspect of the present invention, the bicycle operating device according to the third aspect is configured so that the positioning teeth has a first tooth including a radial outermost tooth contact point and a second tooth including a radial innermost tooth contact point facing the first tooth. The first tooth and the second tooth define a tooth angle between the radial outermost tooth contact point and the radial innermost tooth contact point between ten degrees and fourteen degrees around the rotational axis.

In accordance with a twelfth aspect of the present invention, the bicycle operating device according to the first aspect further comprises a wire take-up member configured to rotate with the positioning structure, and a first operating member movably arranged to rotate the positioning structure and the wire take-up member in the first direction as the first operating member moves from a rest position to an actuated position.

In accordance with a thirteenth aspect of the present invention, the bicycle operating device according to the twelfth aspect further comprises a release member configured to be moved in the first direction from a non-release position towards a release position to selectively move the maintaining member between the first position and the second position, and a second operating member movably arranged to move the release member in the first direction from the non-release position towards the release position as the second operating member moves from a rest position to an actuated position.

In accordance with a fourteenth aspect of the present invention, the bicycle operating device according to the thirteenth aspect is configured so that the first and second operating members are configured as trigger levers that are biased towards the rest positions, respectively.

Also other objects, features, aspects and advantages of the disclosed bicycle operating device will become apparent to those skilled in the art from the following detailed description, which, taken in conjunction with the annexed drawings, discloses one embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
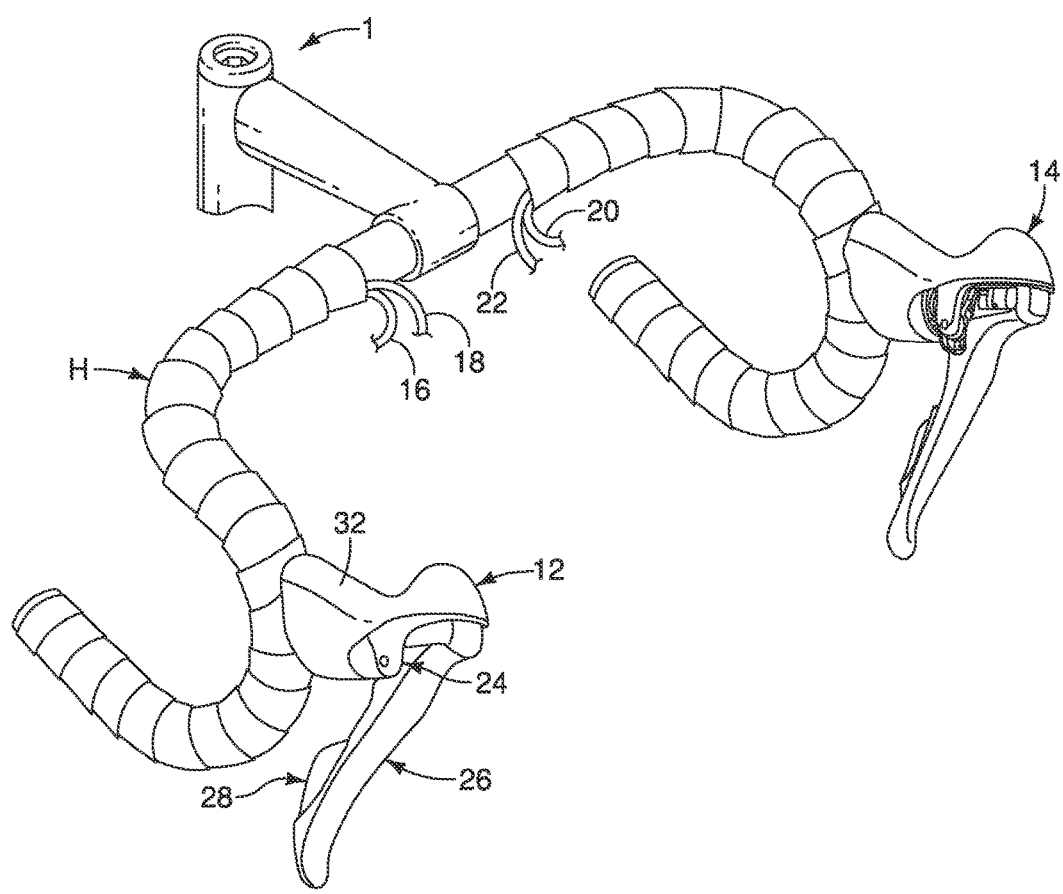
FIG. 1 is a front perspective view of a portion of a bicycle equipped with a pair of bicycle operating devices coupled to a drop type handlebar in their installed positions with each of the bicycle operating devices including a bicycle component positioning unit in accordance with one illustrative embodiment.

Referring initially to FIG. 1, a portion of a bicycle 1 is illustrated that is equipped with a pair of bicycle operating devices 12 and 14 in accordance with one illustrative embodiment. The bicycle operating devices 12 and 14 are mounted on a drop handlebar H in accordance with the illustrated embodiment as seen in FIG. 1. The bicycle operating devices 12 and 14 are mounted to the downwardly curved portions of the drop down handlebar H.

The bicycle operating device 12 is a right hand side operating device operated by the rider's right hand to operate a first brake device (not shown) and a first shifting device (e.g., a cable operated rear derailleur). The bicycle operating device 14 is a left hand side operating device operated by the rider's left hand to operate a second brake device (not shown) and a second shifting device (e.g., a cable operated front derailleur). The first and second shifting devices are part of a conventional bicycle driving system that is used to change speed stages of the drive train in a relatively conventional manner. In the illustrated embodiment, the bicycle operating device 12 is operatively coupled to the first shifting device via a shift control cable 16 and to a brake device via a brake control cable 18. In the illustrated embodiment, the bicycle operating device 14 is operatively coupled to the second shifting device via a shift control cable 20 and to a brake device via a brake control cable 22.

Figure 2:
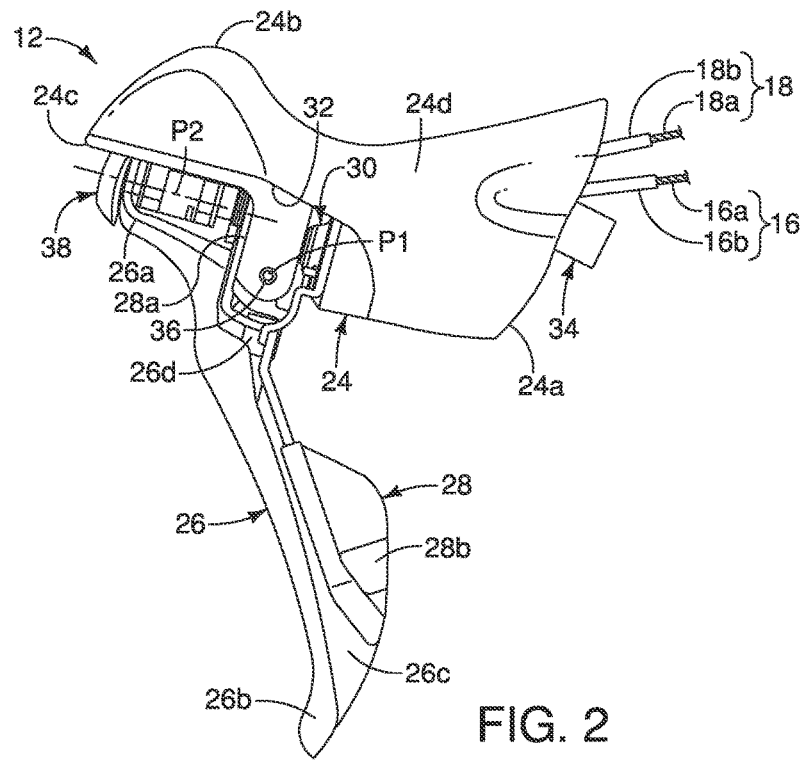
FIG. 2 is an inside elevational view of the right bicycle operating device illustrated in FIG. 1 with first and second operating members in their rest positions (non-actuated position)
Figure 3:
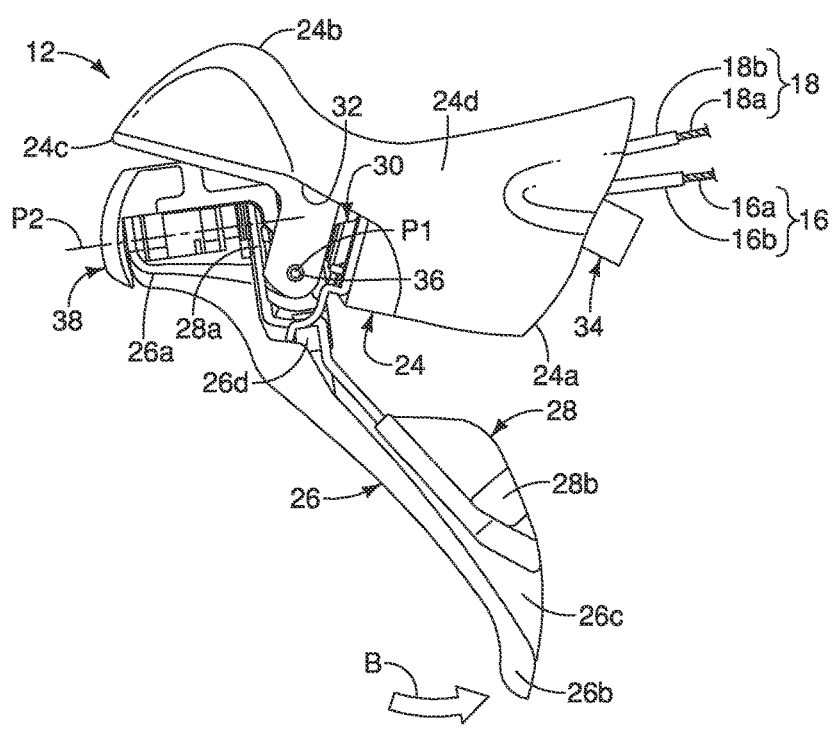
FIG. 3 is an inside elevational view of the right bicycle operating device illustrated in FIGS. 1 and 2 with the first and second operating members pivoted to a braking position.

As seen in FIGS. 2 and 3, preferably, the control cables 16, 18, 20 and 22 are conventional bicycle operating cables that have an outer case covering an inner wire. In other words, each of the control cables 16, 18, 20 and 22 are Bowden type cables basically include an inner wire slidably received within an outer case. For example, as seen in FIG. 3, the shift control cable 16 has an inner wire 16a with an outer case 16b covering the inner wire 16a, while the brake control cable 18 has an inner wire 18a with an outer case 18b covering the inner wire 18a. The inner wire 16a constitutes a connecting member that operatively connects the bicycle operating device 12 to the first shifting device for changing the speed stages in response to operation of the bicycle operating device 12. The inner wire 18a constitutes a connecting member that operatively connects the bicycle operating device 12 to the first brake device for applying a braking force to a wheel in response to operation of the bicycle operating device 12. The control cables 20 and 22 of the bicycle operating device 14 have the same construction as the control cables 16 and 18

While the bicycle operating devices 12 and 14 are illustrated as bicycle operating device that combine both shifting and braking using Bowden type cables, the bicycle operating devices 12 and 14 are not limited to a bicycle operating device that combine both shifting and braking using Bowden type cables. For example, the bicycle operating devices 12 and 14 can be configured for performing only shifting. Also the bicycle operating devices 12 and 14 can be configured for performing braking using a hydraulic operating unit. In the illustrated embodiment, the bicycle operating devices 12 and 14 are essentially identical in operation, except that they are mirror images of each other and they may have a different number of shifting operations. In other words, the bicycle operating device 14 is substantially identical to the bicycle operating device 12, except that the bicycle operating device 14 has been modified to be a mirror image and to decrease the number of gears that can be shifted. Thus, only the bicycle operating device 12 will be discussed and illustrated herein.

In this embodiment, as best seen in FIGS. 2 and 3, the bicycle operating device 12 basically includes a bracket 24, a first user operating lever 26, a second user operating lever 28. Further, the bicycle operating device 12 includes a bicycle component positioning unit 30, which is a shift unit in the illustrated embodiment. The first and second user operating levers 26 and 28 are pivots relative to the bracket 24 for performing shifting operations. In other words, the first and second user operating levers 26 and 28 are examples of user operated levers that are used for operating the bicycle component positioning unit 30 as discussed below. The first user operating lever 26 is also used for performing a braking operation as discussed below. Thus, the bicycle operating device 12 is sometimes called a road "brifter".

As seen in FIGS. 2 and 3, the bracket 24 constitutes a base member that pivotally supports the first and second user operating levers 26 and 28. The bicycle component positioning unit 30 is disposed an interior space or internal cavity of the bracket 24. Typically, the bracket 24 is made of a rigid, hard plastic material. Riders sometimes grip the bracket 24 and lean on the bracket 24 during riding. It is desirable to provide a comfortable feeling for the rider's hand while the rider is gripping the bracket 24. Thus, the bracket 24 has a rigid main body that is covered with a soft outer elastomeric grip cover 32. The grip cover 32 partially covers the bracket 24 as seen in FIGS. 2 and 3. In particular, the grip cover 32 is stretched over a gripping portion of the bracket 24. The precise construction of the bracket 24 depends on the construction of the bicycle component positioning unit 30, which can be a variety of types such a cable operated one as shown or an electrical one (not shown). The bracket 24 is sometimes formed as a one-piece member, while in other cases, the bracket 24 is formed a rigid main body part and one or more panel parts. Since a variety of shift units can be used for the bicycle component positioning unit 30 in the bicycle operating device 12, the precise construction of the bracket 24 will not be discussed herein.

The bracket 24 is provided with a handlebar mounting structure 34 at a rear end (proximal end) 24a for mounting to one of the downwardly curved portions of the drop handlebar H. The bracket 24 has an upwardly protruding portion (pommel portion) 24b at a front end (distal end) 24c. Riders grip between the proximal end 24a and the pommel portion 24b. In other words, the bracket 24 has a gripping portion 24d between the proximal end 24a and the pommel portion 24b. The bracket 24 is a stationary member when mounted to the drop handlebar H by the handlebar mounting structure 34. Since the bracket 24 is fixed to the drop handlebar H by the handlebar mounting structure 34, the bracket 24 constitutes a fixed member with respect to the drop handlebar H. The handlebar mounting structure 34 is preferably a conventional band clamp or similar structure that is used in a road shifter for gripping the drop handlebar H. Since the handlebar mounting structure 34 can be any suitable mounting structure, the handlebar mounting structure 34 will not be discussed or illustrated in detail herein.

Figure 4:
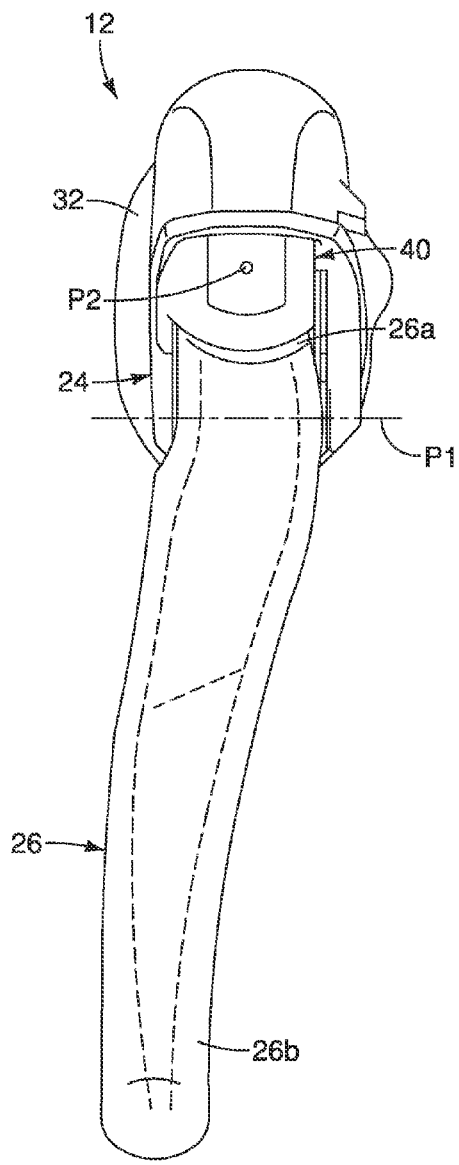
FIG. 4 is a front elevational view of the right bicycle operating device illustrated in FIGS. 1 to 3 with the first and second operating members in their rest positions.
Figure 5:
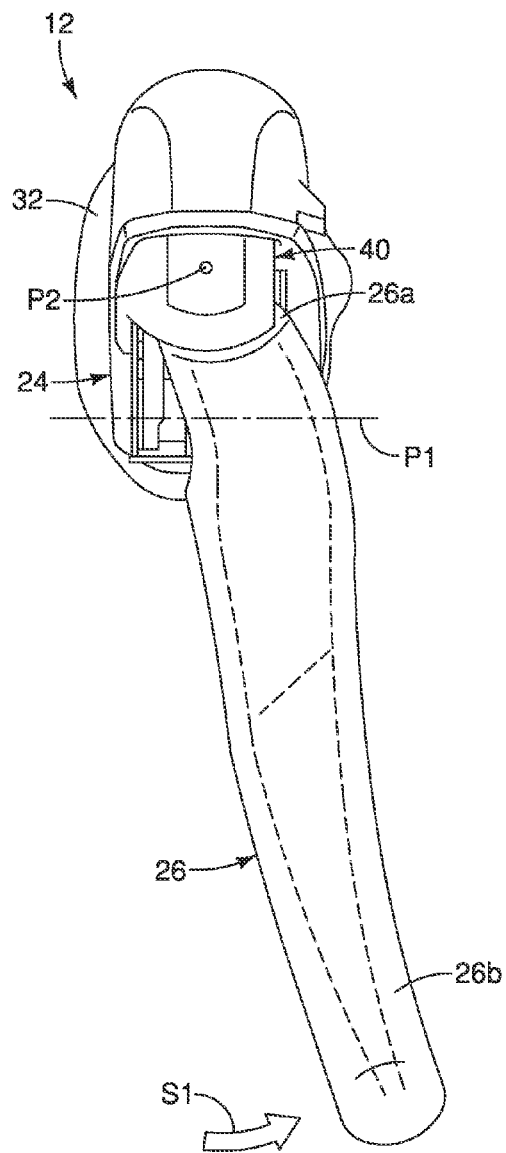
FIG. 5 is a front elevational view of the right bicycle operating device illustrated in FIGS. 1 to 4 with the first and second operating members moved to a cable pulling position.
Figure 6:
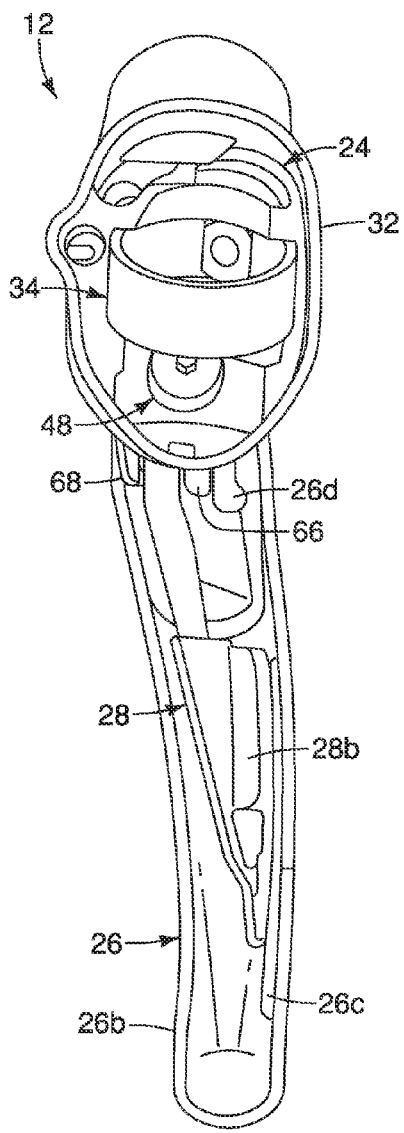
FIG. 6 is a rear elevational view of the right bicycle operating device illustrated in FIGS. 1 to 5 with the first and second operating members in their rest positions.
Figure 7:
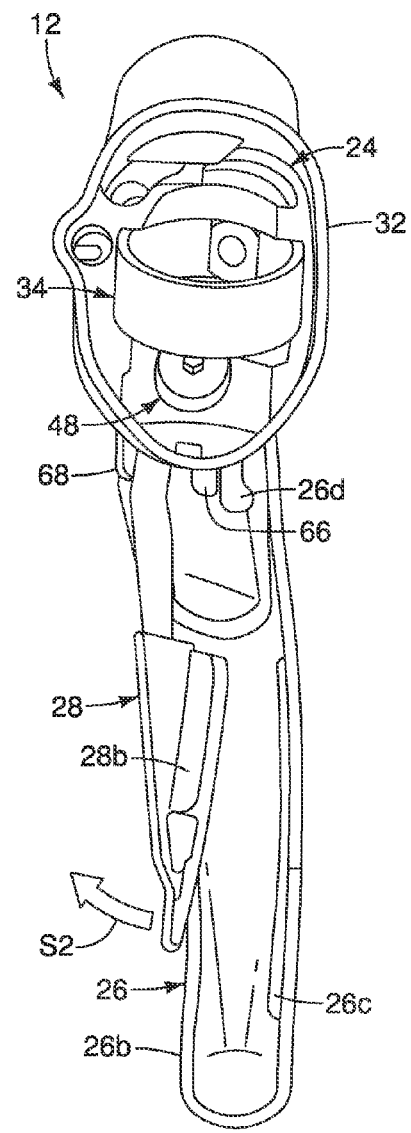
FIG. 7 is a rear elevational view of the right bicycle operating device illustrated in FIGS. 1 to 6 with the second operating member moved to a cable releasing position while the first operating member remains in the rest position.

In the illustrated embodiment, the first user operating lever 26 and the second user operating lever 28 are trigger type levers that are biased to the rest positions in a conventional manner. FIGS. 2, 4 and 6 illustrate the first user operating lever 26 and the second user operating lever 28 in their rest positions. FIGS. 3 and 5 illustrate the first user operating lever 26 in operated positions wherein the second user operating lever 28 is moved by the first user operating lever 26 to operated positions. FIG. 7 illustrates the second user operating lever 28 in an operated position and the first user operating lever 26 in the rest positions. The term "rest position" as used herein refers to a state in which the part (e.g., the first user operating lever 26 and the second user operating lever 28) remains stationary without the need of a user holding the part in that state corresponding to the rest position. The term "operated position" as used herein refers to a state in which the part (e.g., the first user operating lever 26 and the second user operating lever 28) is temporarily held by an external force (e.g., a user holding the part in a state corresponding to the operated position).

As seen in FIGS. 2 to 5, the first user operating lever 26 is used to perform both the braking operation and a first shifting operation (e.g., a cable pulling operation). Thus, the first user operating lever 26 constitutes a user brake/shift operating lever. FIGS. 2 and 3 illustrate the braking operation being performed by the first user operating lever 26. As seen in FIG. 3, the first user operating lever 26 is pivotally mounted relative to the bracket 24 by a pivot pin 36 that is mounted to the bracket 24. The pivot pin 36 defines a brake pivot axis P1 that extends transverse to the lateral surfaces of the bracket 24 to perform the braking operation. In the illustrated embodiment, the first user operating lever 26 is supported on a mounting member 38 that is pivotally attached to the bracket 24 by the pivot pin 36 that defines the brake pivot axis P1.

Specifically, the rider pivots the first user operating lever 26 about the brake pivot axis P1 in a direction generally parallel to the bicycle longitudinal center plane for braking. This pivotal movement of the first user operating lever 26 from the rest position to the operated (braking) position along a non-shift operating path B pulls the inner wire 18a of the brake cable 18 to operate a brake device (not shown). The second user operating lever 28 is pivotally attached to the mounting member 38, and moves together with the first user operating lever 26 and the mounting member 38 as the first user operating lever 26 is operated to perform the braking operation as seen in FIGS. 2 and 3. Thus, the first user operating lever 26 functions as a brake lever.

FIGS. 4 and 5 illustrate the first shifting operation being performed by the first user operating lever 26. As seen in FIGS. 4 and 5, the first user operating lever 26 is pivotally mounted relative to the bracket 24 about a shift pivot axis P2 to perform the first shifting operation. The first user operating lever 26 pivots relative to the bracket 24 along a plane that is transverse to a braking plane of the first user operating lever 26. The shift pivot axis P2 is non coaxial with respect to the brake pivot axis P1.

Specifically, the rider pivots the first user operating lever 26 about the shift pivot axis P2 in a direction S1 towards a bicycle longitudinal center plane for shifting. This pivotal movement of the first user operating lever 26 from the rest position to the shift operated position pulls the inner wire 16a of the shift cable 16. Thus, the first user operating lever 26 functions as a cable pulling lever. The second user operating lever 28 moves together with the first user operating lever 26 as the first user operating lever 26 is operated to perform the first shifting operation as seen in FIGS. 4 and 5. In particular, the first user operating lever 26 contacts the second user operating lever 28 during pivotal movement of the first user operating lever 26 about the shift pivot axis P2 to perform the first shifting operation. However, the second user operating lever 28 does not operate the bicycle component positioning unit 30 when the first user operating lever 26 is pivoted about the shift pivot axis P2 to perform the first shifting operation.

As seen in FIGS. 6 and 7, the second user operating lever 28 is operatively coupled to the bicycle component positioning unit 30 for performing a second shifting operation (i.e., a cable releasing operation). In the illustrated embodiment, the second user operating lever 28 is used to release the inner wire 16a from the bicycle component positioning unit 30 when the second user operating lever 28 is pivoted about the shift pivot axis P2 in a direction S2 towards the center longitudinal plane of the bicycle 10. Thus, the second user operating lever 28 constitutes as a cable releasing lever. The second user operating lever 28 only performs shifting operations. FIG. 6 illustrates the second user operating lever 28 in the rest position, while FIG. 7 illustrates the second user operating lever 28 in a shift operated position. In particular, the second user operating lever 28 is pivotally mounted on the first user operating lever 26 such that the second user operating lever 28 pivots relative to the first user operating lever 26 about the first shift pivot axis P2 (see FIGS. 2 and 3) between the rest position and the shifting position. Thus, the first user operating lever 26 and the second user operating lever 28 have coincident shift pivot axes. The first user operating lever 26 remains stationary or substantially stationary while the second user operating lever 28 is pivoted about the shift pivot axis P2.

Figure 8:
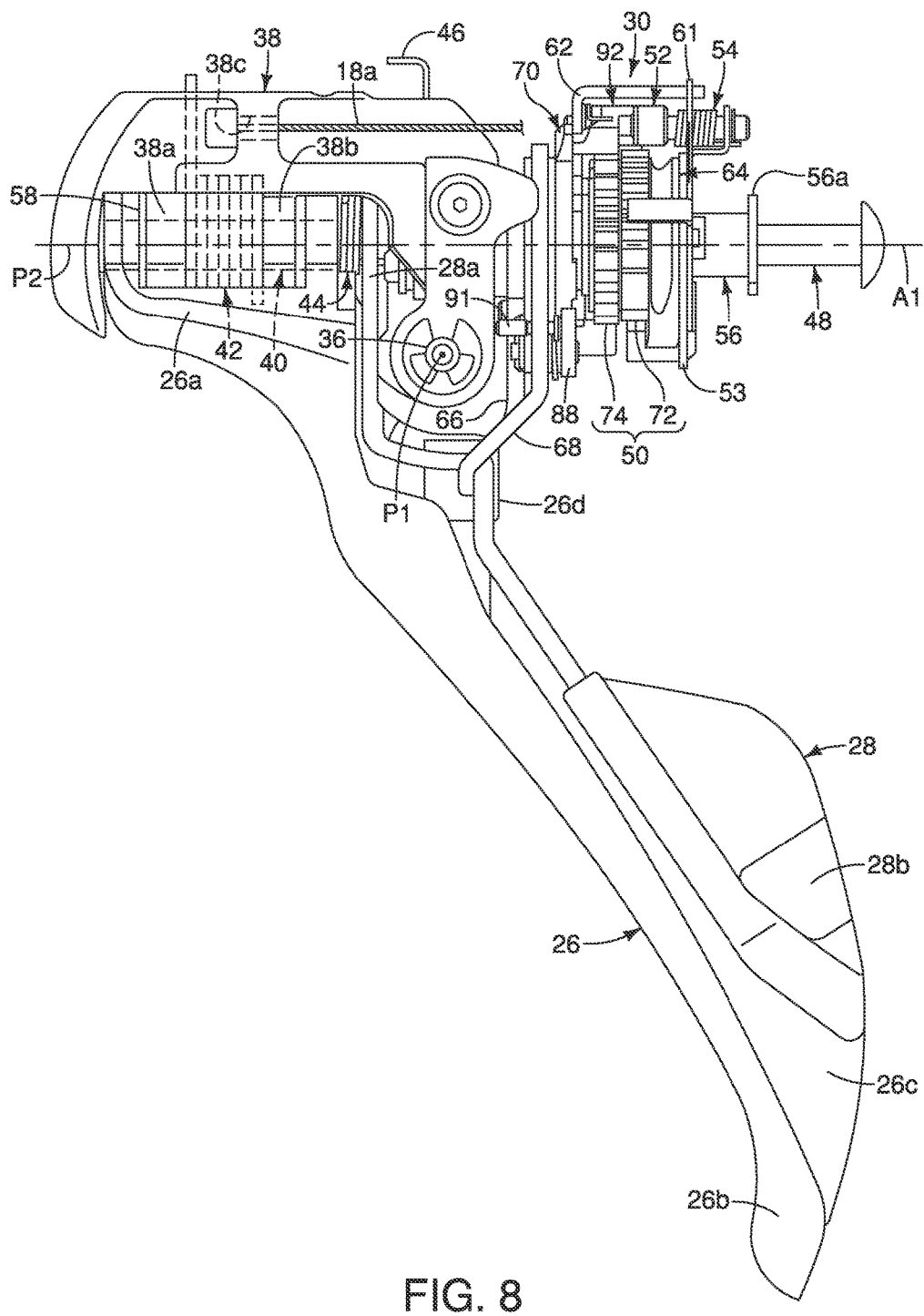
FIG. 8 is an inside elevational view of the right bicycle operating device illustrated in FIGS. 1 to 7 with a bracket removed.
Figure 9:
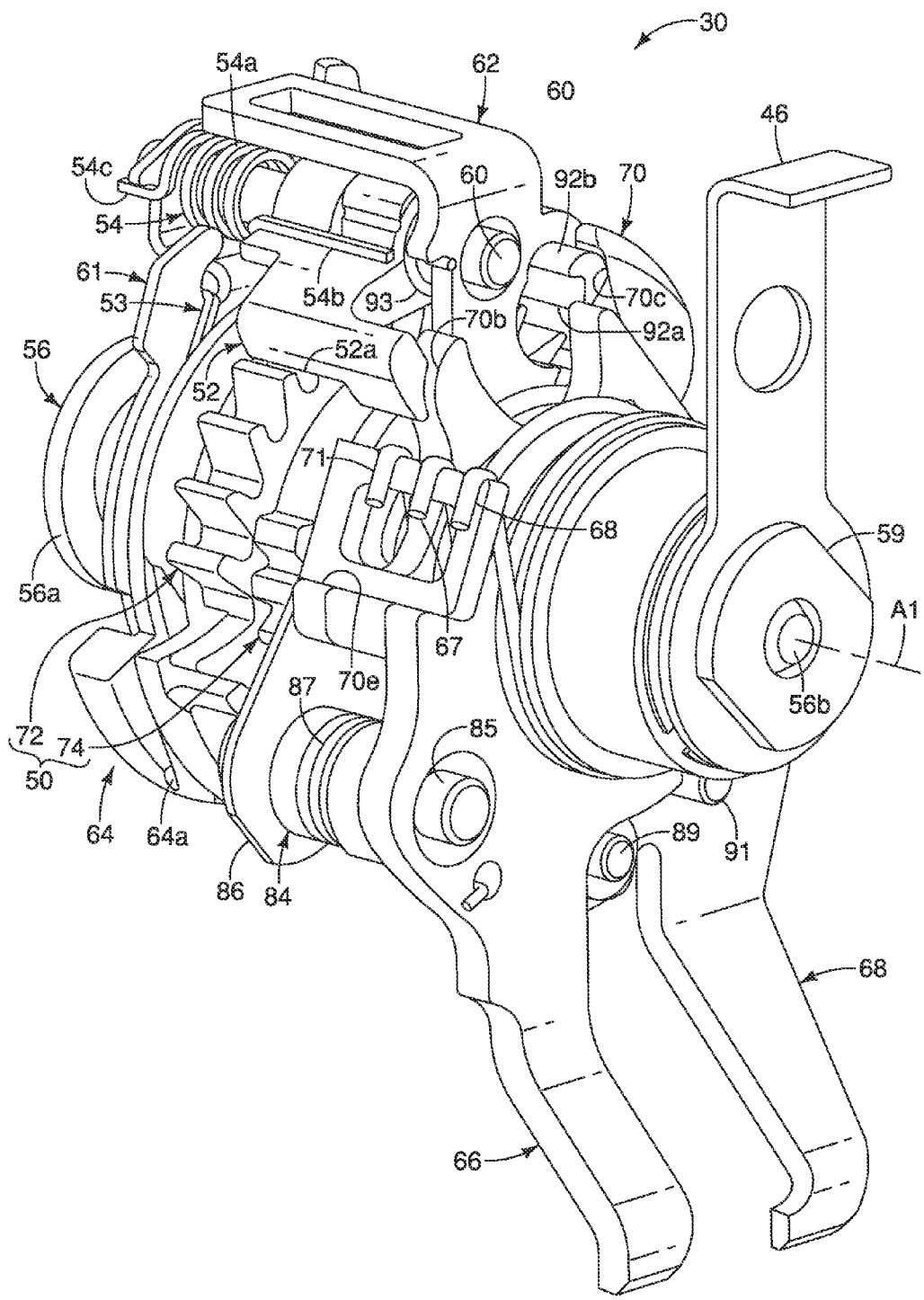
FIG. 9 is a front perspective view of the bicycle component positioning unit (shift unit) of the right bicycle operating device illustrated in FIGS. 1 to 7 with the parts in their rest positions.

As seen in FIG. 8, the first user operating lever 26 and the second user operating lever 28 are movably supported on the bracket 24 by the mounting member 38. In particular, the first user operating lever 26 has a mounting end 26a that is pivotally attached to a pair of attachment flanges 38a and 38b of the mounting member 38 by a pivot axle structure 40. The second user operating lever 28 also has a mounting end 28a that is pivotally attached to the attachment flanges 38a and 38b of the mounting member 38 by the pivot axle structure 40. The pivot axle structure 40 is disclosed in detail in U.S. Pat. No. 9,056,597, which is assigned to Shimano Inc.

The first user operating lever 26 has a user operating portion 26b that is disposed outside of the bracket 24 for the rider to pivot the first user operating lever 26 about the shift pivot axis P2. Similarly, the second user operating lever 28 has a user operating portion 28b that is disposed outside of the bracket 24 for the rider to pivot the second user operating lever 28 about the shift pivot axis P2. The first user operating lever 26 has an abutment 26c that contacts the user operating portion 28b of the second user operating lever 28 when the first user operating lever 26 is pivoted about the shift pivot axis P2 to perform the first shifting operation. In this way, the second user operating lever 28 is pivoted by the first user operating lever 26 when the first user operating lever 26 is pivoted about the shift pivot axis P2 to perform a shifting operation. The first user operating lever 26 also has an abutment 26d that abuts a part of the bicycle component positioning unit 30 to operate the bicycle component positioning unit 30 as explained later.

As seen in FIG. 8, the mounting member 38 has a cable attachment hole 38c for attaching the inner wire 18a of the brake control cable 18. The pivot pin 36 is located in holes of pivot attachment portions of the bracket 24 and the mounting member 38 such that the inner wire 18a of the brake control cable 18 is pulled as the first user operating lever 26 pivoted on the pivot pin 36 from the rest position (FIG. 2) to the braking position (FIG. 3). A biasing element (not shown) is provided on the pivot pin 36 for biasing the mounting member 38 and the first user operating lever 26 to the rest position as position (FIG. 2) with respect to the bracket 24. In the illustrated embodiment, the biasing element for biasing the mounting member 38 and the first user operating lever 26 is a torsion spring with its coiled portion disposed on the pivot pin 36, a first free end contacting the bracket 24 and a second free end contacting the mounting member 38.

As seen in FIG. 8, a first biasing member 42 is provided between the first user operating lever 26 and the mounting member 38. The first biasing member 42 biases the first user operating lever 26 relative to the mounting member 38 about the shift pivot axis P2 toward a rest position. In the illustrated embodiment, the first biasing member 42 is a torsion spring that is disposed on a center section of the pivot axle structure 40. More specifically, the first biasing member 42 has a first end that is disposed in a hole of the first user operating lever 26, and a second end that is disposed in a hole of the mounting member 38. The first biasing member 42 has its coiled portion disposed on the pivot axle structure 40. Similarly, a second biasing member 44 is provided between the second user operating lever 28 and the mounting member 38. The second biasing member 44 is arranged for biasing the second user operating lever 28 relative to the first user operating lever 26 about the shift pivot axis P2 toward the rest position. In the illustrated embodiment, the second the biasing member 44 is a torsion spring that is disposed on the pivot axle structure 40. In the illustrated embodiment, the second biasing member 44 has a first end that is disposed in a hole of the second user operating lever 28, and a second end that contacts the mounting member 38. The second biasing element 44 has its coiled portion disposed on a lever attachment portion of the pivot axle structure 40.

The bicycle component positioning unit 30 is mounted to the bracket 24 by a mounting hanger 46 and a mounting bolt 48. The mounting hanger 46 supports the front end of the bicycle component positioning unit 30, while the mounting bolt 48 supports the rear end of the bicycle component positioning unit 30. The mounting hanger 46 is attached to the bracket 24 by a screw (not shown) that is threaded into the bracket 24. The mounting bolt 48 extends through a hole in the rear end of the bracket 24, and is threaded into the bicycle component positioning unit 30. With this attachment arrangement, the bicycle component positioning unit 30 is mounted on the bracket 24 such that the bicycle component positioning unit 30 that is detachable from the bracket 24 as an integrated unit.

Referring now to FIGS. 9 to 19, the bicycle component positioning unit 30 of the bicycle operating device 12 will now be discussed in more detail. In the illustrated embodiment, the bicycle component positioning unit 30 is a cable operated unit. More specifically, the bicycle component positioning unit 30 is a shift unit that pulls and releases the inner wire 16a such that the inner wire 16a is selectively held in one of a plurality of predetermined positions. However, it will be apparent from this disclosure that the bicycle component positioning unit 30 can be used in other bicycle component operating devices such as a bicycle suspension operating device. Moreover, it will be apparent from this disclosure that the bicycle component positioning unit 30 can be used in non-cable operating devices if needed and/or desired.

In the illustrated embodiment, as seen in FIGS. 9 to 13, the bicycle component positioning unit 30 of the bicycle operating device 12 basically comprises a positioning structure 50 and a maintaining member 52. As explained later, in the illustrated embodiment, the positioning structure 50 cooperates with the maintaining member 52 hold the inner wire 16a one of the predetermined positions. The positioning structure 50 is arranged to rotate about a rotational axis A1. The positioning structure 50 is configured to be movable in a first direction D1 and a second direction D2 that is opposite the first direction D1. Here as seen in FIGS. 14 to 17, the first and second directions D1 and D2 are rotational directions that are centered on the rotational axis A1. However, the bicycle component positioning unit 30 could be reconfigured so that the positioning structure 50 could be moved in a linear direction. In the illustrated embodiment, the first direction D1 corresponds to a cable pulling direction, while the second direction D2 corresponds to a cable releasing direction. Preferably, the positioning structure 50 is biased about the rotational axis A1 in the second direction D2 by a biasing element 53.

Figure 20:
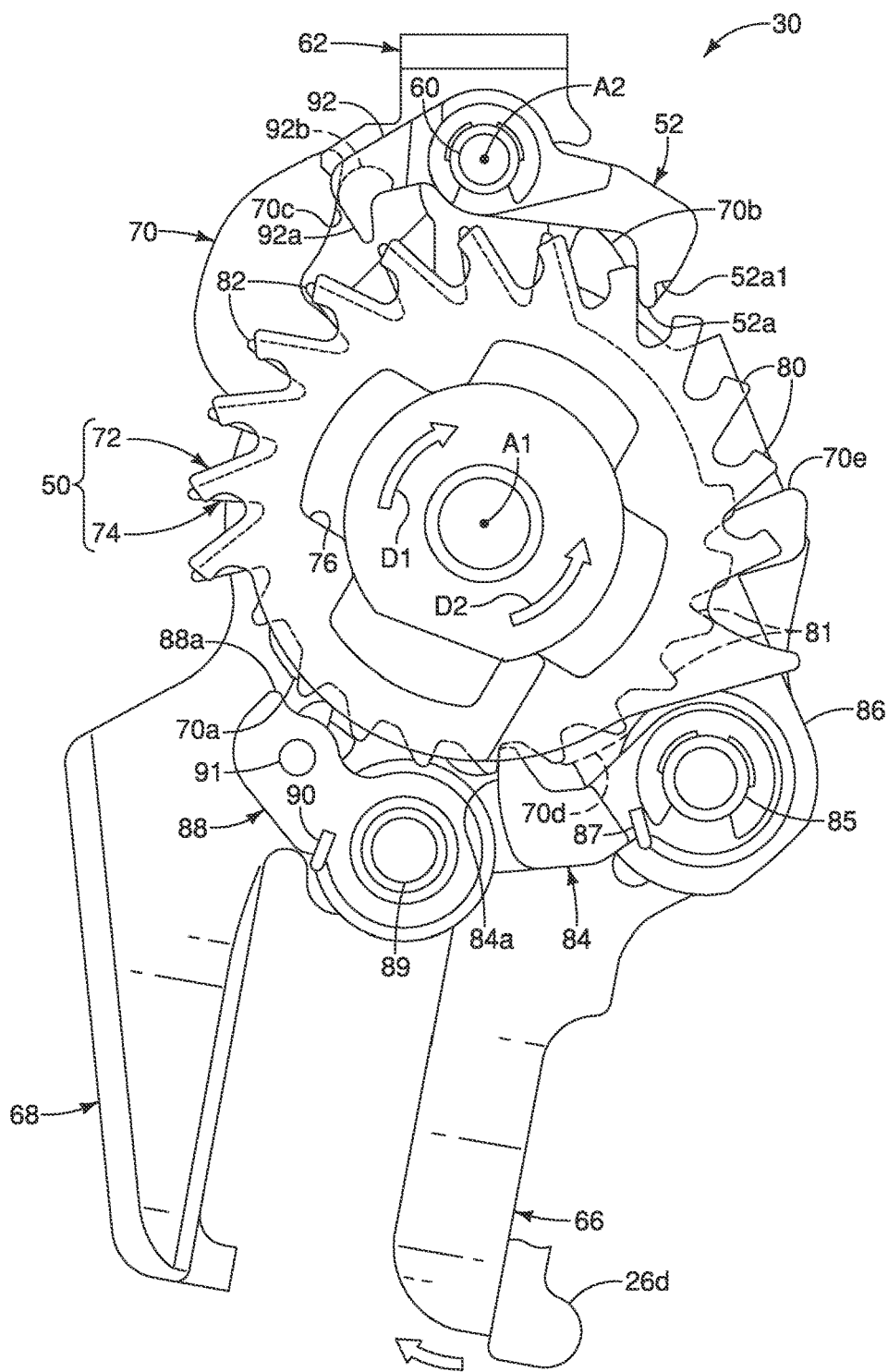
FIG. 20 is a rear elevational view, similar to FIG. 15, of the selected parts of the bicycle component positioning unit but with the first operating member being initially pivoted to start a cable pulling operation, which also results in the second operating member being moved.

Basically, the maintaining member 52 is configured to move between a first position (maintaining position) that maintains the positioning structure 50 in one of a plurality of predetermined positions and a second position (releasing position) that releases the positioning structure 50 to move to another one of the predetermined positions. In particular, the maintaining member 52 contacts the positioning structure 50 to selectively maintain the positioning structure 50 in one of the predetermined positions as explained later. In the illustrated embodiment, the maintaining member 52 is a position maintaining pawl. The maintaining member 52 includes a maintaining tooth 52a that selectively engages the positioning structure 50 to establish the predetermined positions. The maintaining tooth 52a includes a recess 52a1 (FIG. 20). As explained later in more detail, the recess 52a1 is configured to receive the positioning structure 50, while the maintaining tooth 52a is engaged with the positioning structure 50 to maintain the positioning structure 50 in one of the predetermined positions.

Also as explained later in more detail, the positioning structure 50 and the maintaining member 52 are configured such that the maintaining member 52 applies a rotating force on the positioning structure 50 in the first direction D1 as the maintaining member 52 moves from the second position to the first position. In particular, the maintaining member 52 is pivotally mounted around a pivot axis A2 between the first position and the second position. A biasing element 54 is provided to bias the maintaining member 52 towards the positioning structure 50. As a result, the maintaining member 52 is biased such that the maintaining tooth 52a contacts the positioning structure 50. In this way, as explained later, the biasing element 54 applies a boost force on the positioning structure 50 during the cable pulling operation of the inner wire 16a to make the cable pulling operation (first shifting operation) easier for the user. In other words, the boost force of the biasing element 54 assist the user in rotating the positioning structure 50 during the cable pulling operation (first shifting operation) to reduce an input force applied by the user to rotate the positioning structure 50 in the first direction D1.

Here, the bicycle component positioning unit 30 includes a support structure that supports the positioning structure 50 and the maintaining member 52 on the bracket 24 of the bicycle operating device 12. In the illustrated embodiment, the support structure includes a support axle 56, an axle nut 59, a pivot axle 60, a first stationary support plate 61 and a second stationary support plate 62. Thus, the support structure constitutes a fixed member of the bicycle component positioning unit 30. Of course, it will be apparent from this disclosure that the fixed member is not limited to the support structure of the illustrated embodiment. Moreover, each of the parts of the support structure can be individually considered to be a fixed member of the bicycle component positioning unit 30. In other words, the parts of the bicycle operating device 12 that are stationary with respect to the parts of the bicycle component positioning unit 30 are each considered to be a fixed member.

The positioning structure 50 is rotatably supported on the support axle 56, while the maintaining member 52 is pivotally supported on the pivot axle 60. The support axle 56 defines a rotational axis A1 of the positioning structure 50. The pivot axle 60 defines the pivot axis A2 of the maintaining member 52. The pivot axis A2 is offset and parallel to the rotational axis A1. The biasing element 54 is mounted on the pivot axle 60. In particular, in the illustrated embodiment, the biasing element 54 is a torsion spring that has a coiled portion 54a that is spirally wrapped around the pivot axle 60. The biasing element 54 has a first free end portion 54b that engages the maintaining member 52, and a second free end portion 54c that is hooked onto the first stationary support plate 61. In this way, the maintaining member 52 is biased about the pivot axis A2 by the biasing element 54 towards the positioning structure 50.

The support axle 56 is a bolt that has a head 56a at one end and a shaft 56b that is threaded at the end opposite the head 56a. In particular, the head 56a of the support axle 56 abuts against the first stationary support plate 61 with an anti-rotation structure formed therebetween. The first and second stationary support plates 61 and 62 are supported on the shaft 56b. The first and second stationary support plates 61 and 62 are preferably rigid members that are made of a suitable material such as a metallic material. The mounting hanger 46 has a lower opening that receives the shaft 56b therethrough. The axle nut 59 is threaded onto the threaded end of the shaft 56b for securing the mounting hanger 46 to the shaft 56b and holding the various parts of the bicycle component positioning unit 30 together on the shaft 56b.

The support axle 56 is also provided with various spacers and bushings for properly spacing and rotatably supporting various parts of the bicycle component positioning unit 30. Since the spacers and bushings are conventional parts that are typically found in bicycle component positioning unit 30, these spacers and bushings of the bicycle component positioning unit 30 will not be discussed and/or illustrated herein.

In the illustrated embodiment, the bicycle component positioning unit 30 of the bicycle operating device 12 further comprises a wire take-up member 64 that is configured to rotate with the positioning structure 50 about the rotational axis A1. The wire take-up member 64 is rotatably supported on the shaft 56b of the support axle 56. The positioning structure 50 is non-rotatably disposed on the wire take-up member 64. In particular, the wire take-up member 64 has at least one projection that mates with the positioning structure 50 to prevent relative rotation between the positioning structure 50 and the wire take-up member 64. The wire take-up member 64 has a cable attachment structure 64a for attaching a nipple of the inner wire 16a thereto. The wire take-up member 64 acts a spool in the illustrated embodiment. The wire take-up member 64 is preferably a rigid member that is made of a suitable material such as a hard, rigid plastic material.

Since the positioning structure 50 and the wire take-up member 64 are non-rotatably coupled together, the wire take-up member 64 is also biased about the rotational axis A1 in the second direction D2 by the biasing element 53. Here, in the illustrated embodiment, the biasing element 53 is a flat-coiled torsion spring. The biasing element 53 has a coiled portion 53a that is wrapped around the shaft 56b of the support axle 56. The biasing element 53 has a first free end portion 53b that is disposed in a hole of the wire take-up member 64, and a second free end portion 53c that is hooked onto the first stationary support plate 61. In this way, the positioning structure 50 and the wire take-up member 64 are biased about the rotational axis A1 in the second direction D2, which corresponds to the cable releasing direction, by the biasing element 53.

In the illustrated embodiment, the bicycle component positioning unit 30 of the bicycle operating device 12 further comprises a first operating member 66 that is movably arranged to rotate the positioning structure 50 and the wire take-up member 64 in the first direction D1 as the first operating member 66 moves from a rest position to an actuated position. The first operating member 66 is rotatably mounted on the shaft 56b of the support axle 56. In the illustrated embodiment, the first operating member 66 is moved from the rest position to the actuated position in response to operation of the first user operating lever 26 from the rest position to the actuated position. Thus, operation of the first operating member 66 by the first user operating lever 26 causes the wire take-up member 64 to rotate in the first direction D1, which corresponds to the cable pulling direction, for pulling the inner wire 16a. Alternatively, the bicycle operating device 12 can be configured such that the first operating member 66 can be a user operating lever that is directly operated by the rider instead of the rider using the first user operating lever 26 to operate the first operating member 66.

Figure 10:
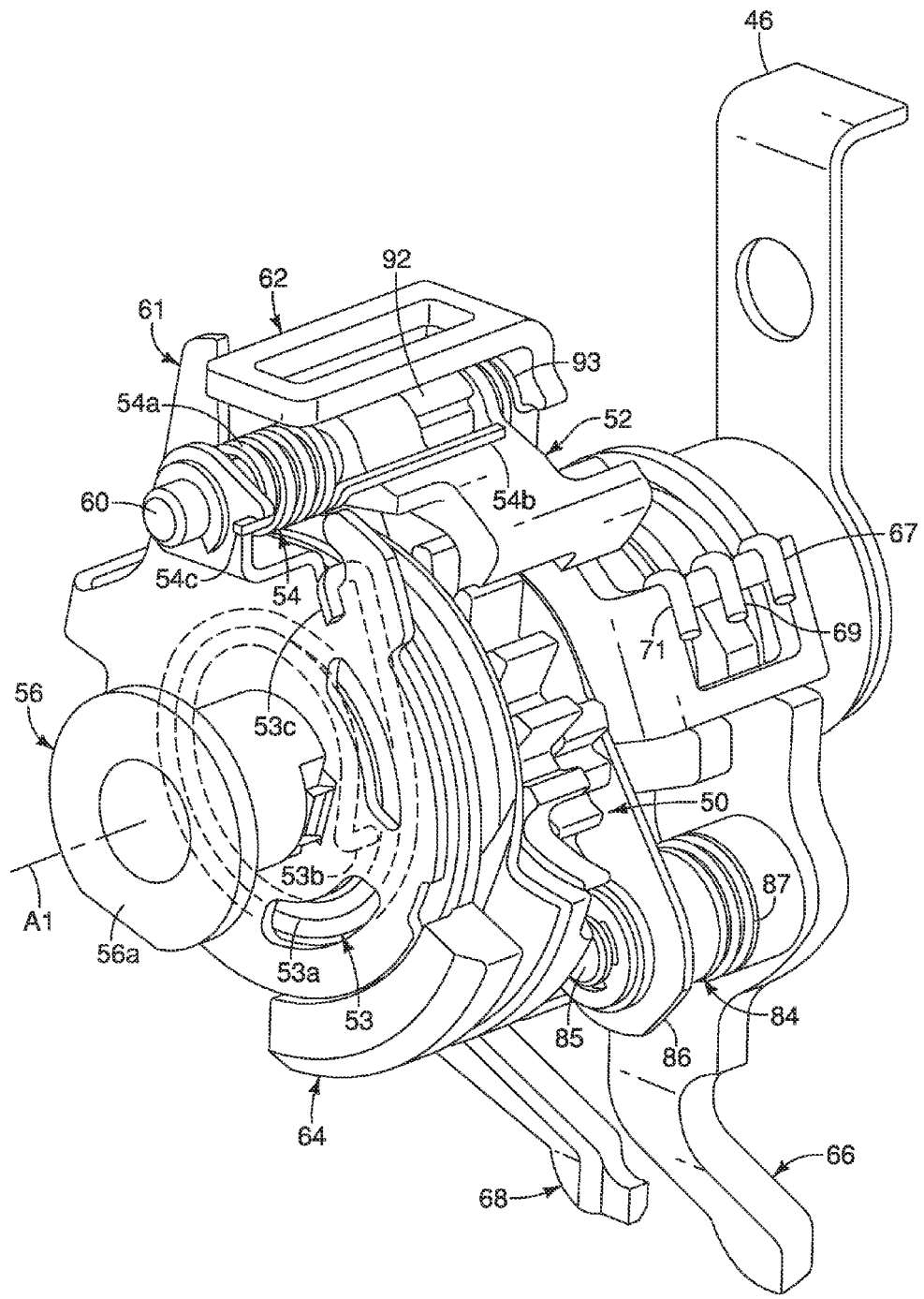
FIG. 10 is a rear perspective view of the bicycle component positioning unit illustrated in FIG. 9 with the parts in their rest positions.

Preferably, the first operating member 66 is biased about the rotational axis A1 in the second direction D2 by a biasing element 67 (FIG. 10). Here, in the illustrated embodiment, the biasing element 67 is a flat-coiled torsion spring. The biasing element 67 has a coiled portion that is wrapped around the shaft 56b of the support axle 56. The biasing element 67 has a first free end portion that is hooked onto the first operating member 66, and a second free end portion that is hooked onto the second stationary support plate 62. In this way, the first operating member 66 is biased about the rotational axis A1 in the second direction D2 by the biasing element 67. Thus, the first operating member 66 is configured as a trigger lever that is biased towards the rest position.

In the illustrated embodiment, the bicycle component positioning unit 30 of the bicycle operating device 12 further comprises a second operating member 68 that is used to release the positioning structure 50 and the wire take-up member 64 for movement in the second direction D2. The second operating member 68 is rotatably mounted on the shaft 56b of the support axle 56. In the illustrated embodiment, the second operating member 68 is moved from the rest position to the actuated position in response to operation of the second user operating lever 28 from the rest position to the actuated position. Thus, operation of the second operating member 68 by the second user operating lever 28 causes the wire take-up member 64 to rotate in the second direction D2, which corresponds to the cable releasing direction, for releasing the inner wire 16a. Alternatively, the bicycle operating device 12 can be configured such that the second operating member 68 can be a user operating lever that is directly operated by the rider instead of the rider using the second user operating lever 28 to operate the second operating member 68.

Preferably, the second operating member 68 is biased about the rotational axis A1 in the second direction D2 by a biasing element 69. Here, in the illustrated embodiment, the biasing element 69 is a flat-coiled torsion spring. The biasing element 69 has a coiled portion that is wrapped around the shaft 56b of the support axle 56. The biasing element 69 has a first free end portion that is hooked onto the second operating member 68, and a second free end portion that is hooked onto the second stationary support plate 62. In this way, the second operating member 68 is biased about the rotational axis A1 in the second direction D2 by the biasing element 69. Thus, the second operating member 68 is configured as a trigger lever that is biased towards the rest position.

In particular, the bicycle component positioning unit 30 of the bicycle operating device 12 further comprises a release member 70 that is configured to move in the first direction D1 from a non-release position towards a release position to selectively move the maintaining member 52 between the first position and the second position. The second operating member 68 is movably arranged to move the release member 70 in the first direction D1 from the non-release position towards the release position as the second operating member 68 moves from a rest position to an actuated position.

Preferably, the release member 70 is biased about the rotational axis A1 in the second direction D2 by a biasing element 71. Here, in the illustrated embodiment, the biasing element 71 is a flat-coiled torsion spring. The biasing element 71 has a coiled portion 71a that is wrapped around the shaft 56b of the support axle 56. The biasing element 71 has a first free end portion 71b that is hooked onto the release member 70, and a second free end portion 71c that is hooked onto the second stationary support plate 62. In this way, the release member 70 is biased about the rotational axis A1 in the second direction D2 by the biasing element 71.

In the illustrated embodiment, the positioning structure 50 includes a first positioning ratchet 72 and a second positioning ratchet 74. The first and second positioning ratchets 72 and 74 are examples of positioning members that are no rotatably coupled to the wire take-up member 64. In particular, the first positioning ratchet 72 has a non-circular opening 76 (see, FIG. 15) for engaging a non-circular projection (not shown) of the wire take-up member 64. Likewise, the second positioning ratchet 74 has a non-circular opening 78 (see, FIG. 16) for engaging the non-circular projection (not shown) of the wire take-up member 64. The first and second positioning ratchets 72 and 74 are preferably rigid members that are made of a suitable material such as a metallic material. The first and second positioning ratchets 72 and 74 are rotatably mounted on the support axle 56.

The first positioning ratchet 72 of the positioning structure 50 includes a plurality of positioning teeth 80 defining the predetermined positions. The first positioning ratchet 72 is a first ratchet plate having the positioning teeth 80 formed by an outer peripheral edge of the first ratchet plate. The second positioning ratchet 74 of the positioning structure 50 includes a plurality of pulling teeth 81 and a plurality of stop teeth 82. The second positioning ratchet 74 is a second ratchet plate having the pulling teeth 81 and the stop teeth 82 formed by an outer peripheral edge of the second ratchet plate.

The number of the positioning teeth 80, the number of the pulling teeth 81 and the number of the stop teeth 82 depends on the desired number of predetermined positions that are desired and/or needed. For example, when the bicycle component positioning unit 30 is used for a front derailleur or for a suspension, the number of the positioning teeth 80, the number of the pulling teeth 81 and the number of the stop teeth 82 can be reduced to two or three.

Figure 15:
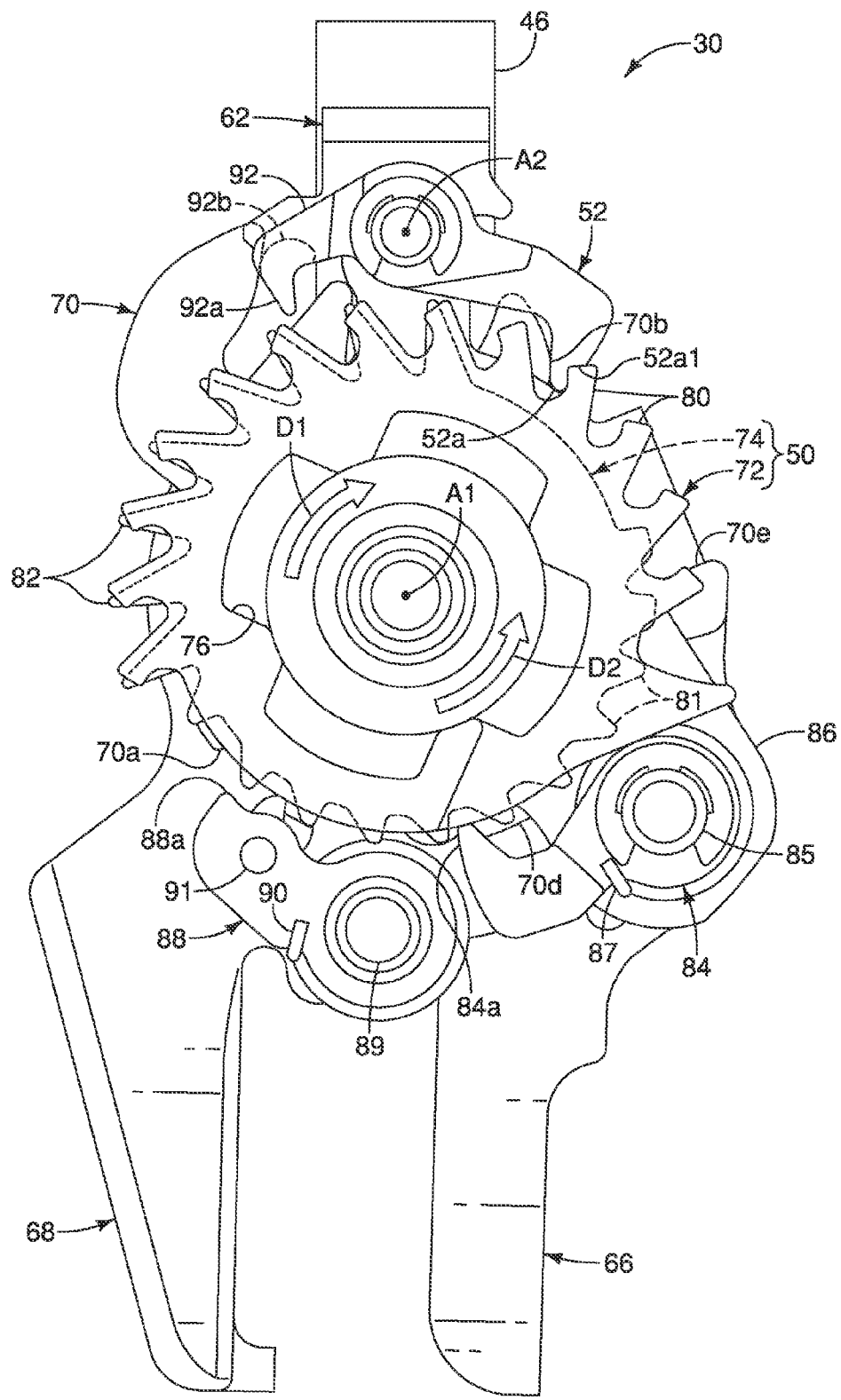
FIG. 15 is a rear elevational view of the selected parts of the bicycle component positioning unit illustrated in FIG. 14.
Figure 16:
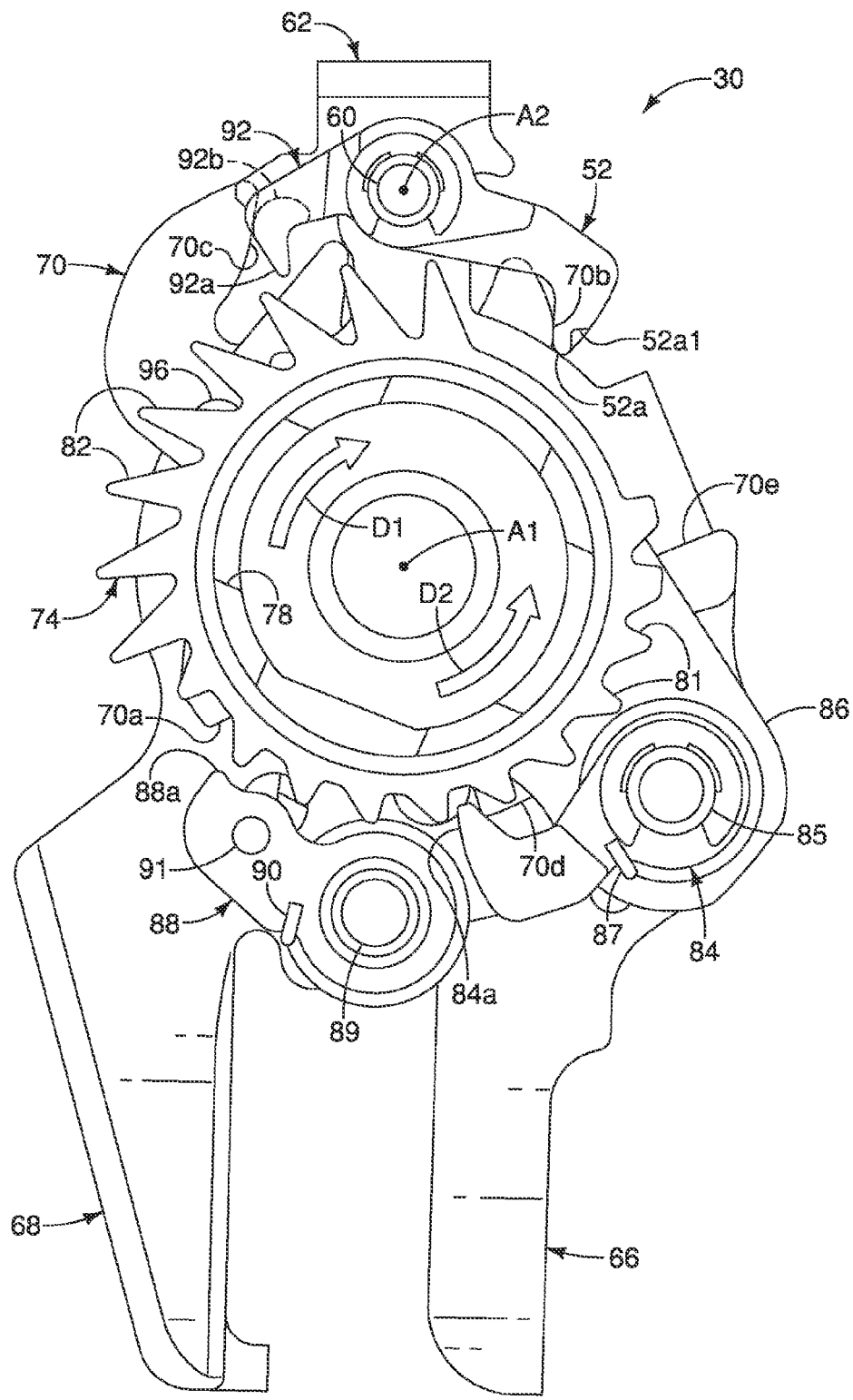
FIG. 16 is a rear elevational view, similar to FIG. 15, of selected parts of the bicycle component positioning unit but with a first positioning ratchet of the positioning structure removed.
Figure 17:
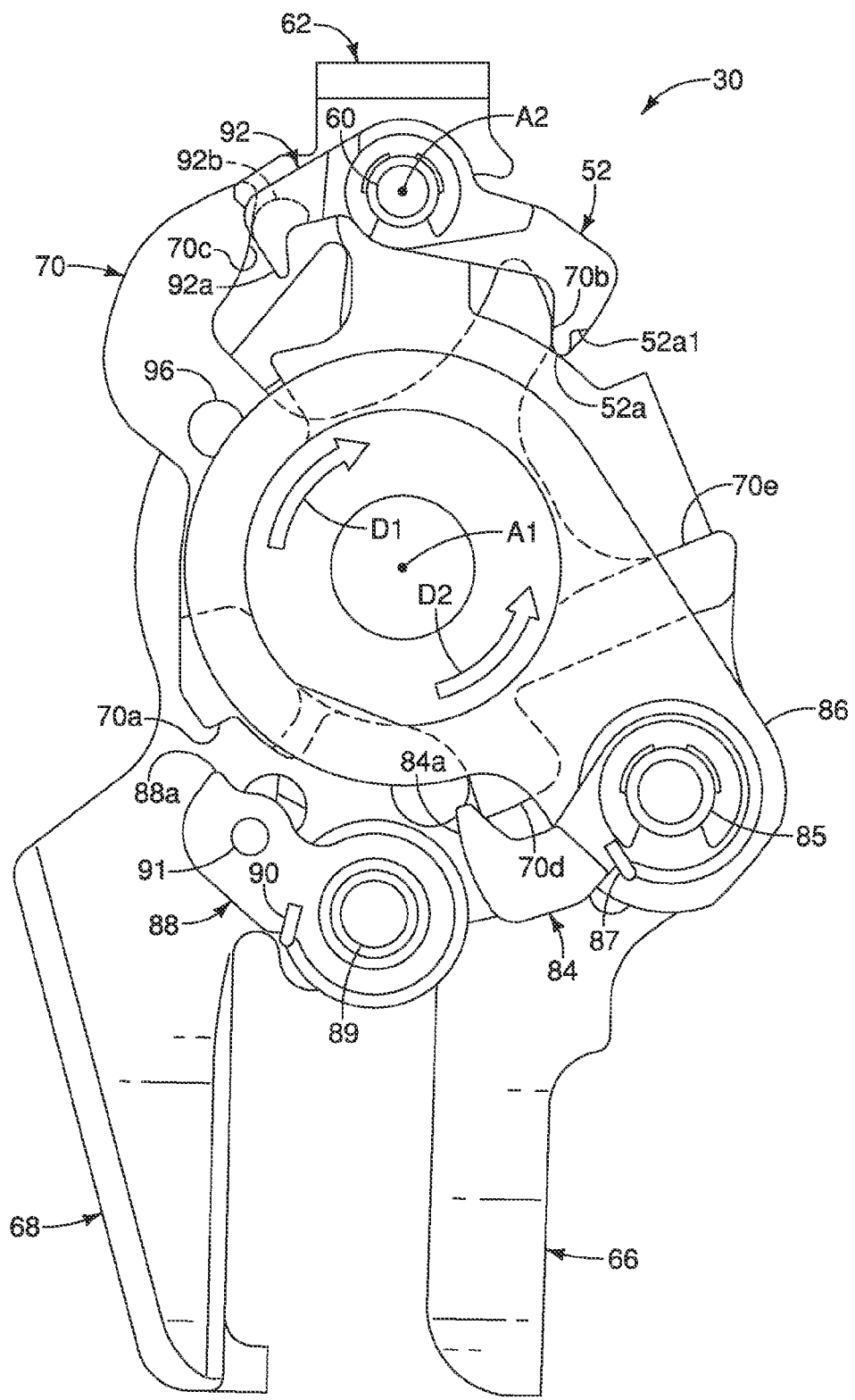
FIG. 17 is a rear elevational view, similar to FIG. 16, of selected parts of the bicycle component positioning unit but with a second positioning ratchet of the positioning structure also removed.
Figure 18:
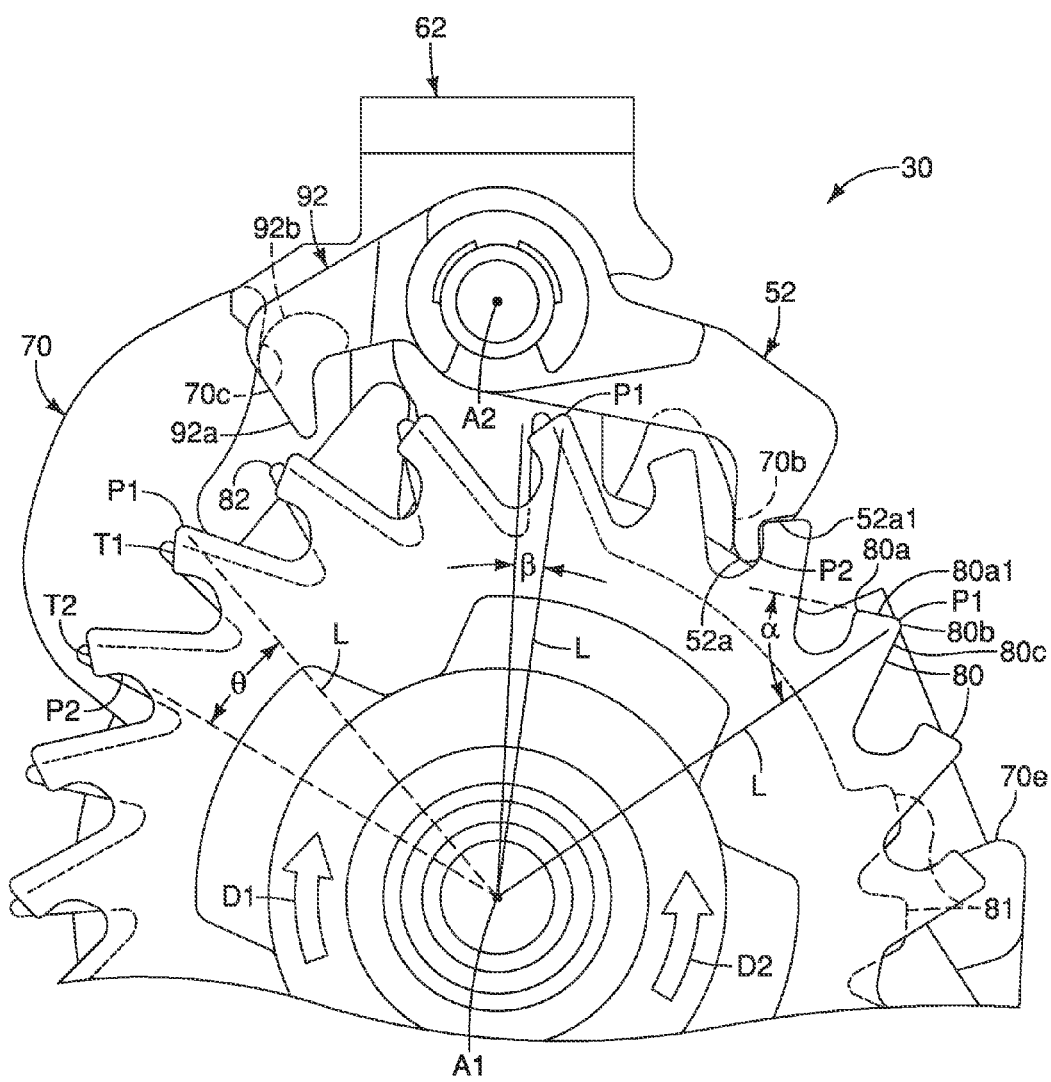
FIG. 18 is an enlarged rear elevational view of an upper portion of the selected parts of the bicycle component positioning unit illustrated in FIG. 14.
Figure 19:
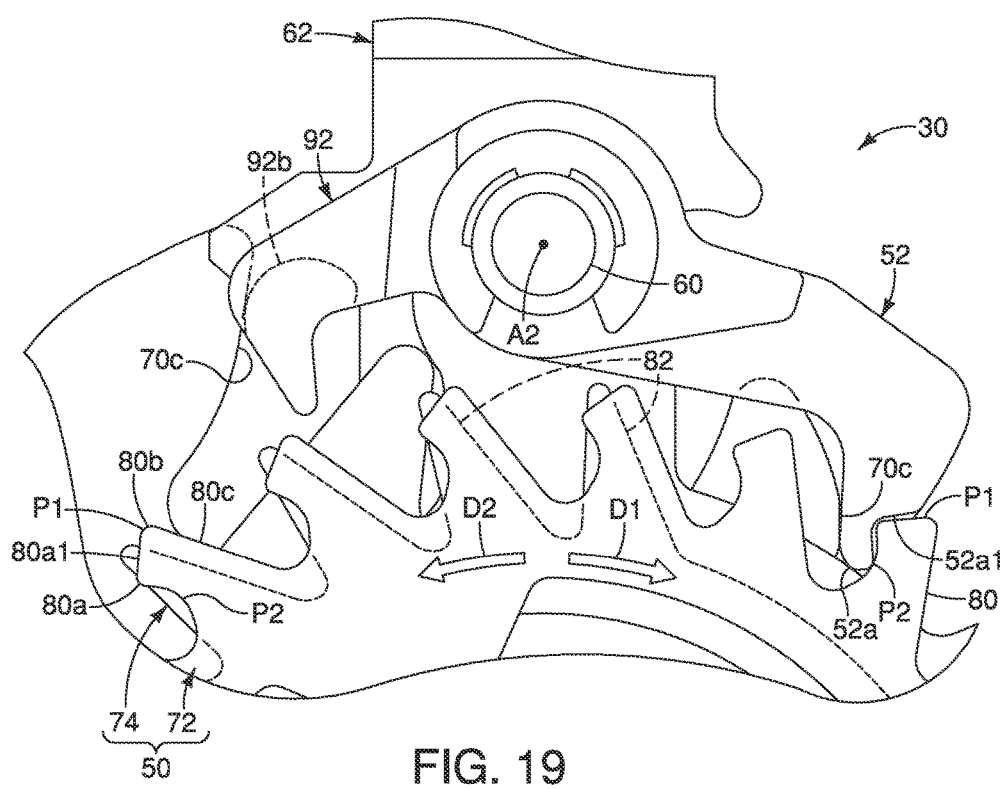
FIG. 19 is a further enlarged rear elevational view of the upper portion of the selected parts of the bicycle component positioning unit illustrated in FIG. 18.

Referring to FIGS. 15, 18 and 19, in the illustrated embodiment, the positioning teeth 80 are all identical. However, it will be apparent from this disclosure that each of the positioning teeth 80 can have a different configuration as needed and/or desired. The maintaining tooth 52a of the maintaining member 52 selectively engages the positioning teeth 80 to establish the predetermined positions. In the illustrated embodiment, each of the positioning teeth 80 includes a protrusion 80a that projects in the second direction D2 with respect to the rotational axis A1. The protrusion 80a is configured to be disposed in the recess 52a1 of the maintaining tooth 52a while the maintaining member 52 is in the first position. Each of the positioning teeth 80 includes a contact surface 80a1. The contact surface 80a1 is configured to be substantially flat. The contact surface 80a1 is provided on the protrusion 80a. During a cable pulling operation, the maintaining tooth 52a rides along the contact surface 80a1 applying the rotating force on the at least one of the positioning teeth 80 in the first direction D1 as the maintaining member 52 moves from the second position to the first position.

In the illustrated embodiment, each of the positioning teeth 80 includes a top portion 80b. The top portion 80b is located on the first direction D1 side of the protrusion 80a with respect to the rotational axis A1. Thus, the contact surface 80a1 is arranged at the second direction D2 side with respect to the top portion 80b. The contact surface 80a1 has a slant angle α with respect to a line L extending from the rotational axis A1 to the top portion 80b. The slant angle α is between five degrees and sixty degrees. More preferably, the slant angle α is preferably between fifteen degrees and forty five degrees. The contact surface 80a1 has a contact angle β between one degree and six degree around the rotational axis A1. The top portion 80b of each of the positioning teeth 80 includes a radial outermost tooth contact point P1 that is the outermost point of each of the positioning teeth 80 with respect to the rotational axis A1 that contacts the maintaining tooth 52a. Each of the positioning teeth 80 includes a radial innermost tooth contact point P2 that is the innermost point of each of the positioning teeth 80 with respect to the rotational axis A1 that contacts the maintaining tooth 52a while in the first position. The positioning teeth 80 has a first tooth including a radial outermost tooth contact point and a second tooth including a radial innermost tooth contact point facing the first tooth. The first tooth and the second tooth define a tooth angle θ between the radial outermost tooth contact point P1 and the radial innermost tooth contact point P2 between ten degrees and fourteen degrees around the rotational axis A1.

In the illustrated embodiment, each of the positioning teeth 80 further includes a cam portion 80c. The cam portion 80c is located on the first direction D1 side of the top portion 80b with respect to the rotational axis A1. The cam portion 80c engages the maintaining tooth 52a of the maintaining member 52 during the first operation (the cable pulling operation) to move the maintaining member 52 from the first position to the second position. In this way, the positioning structure 50 is released to move to another one of the predetermined positions.

Figure 14:
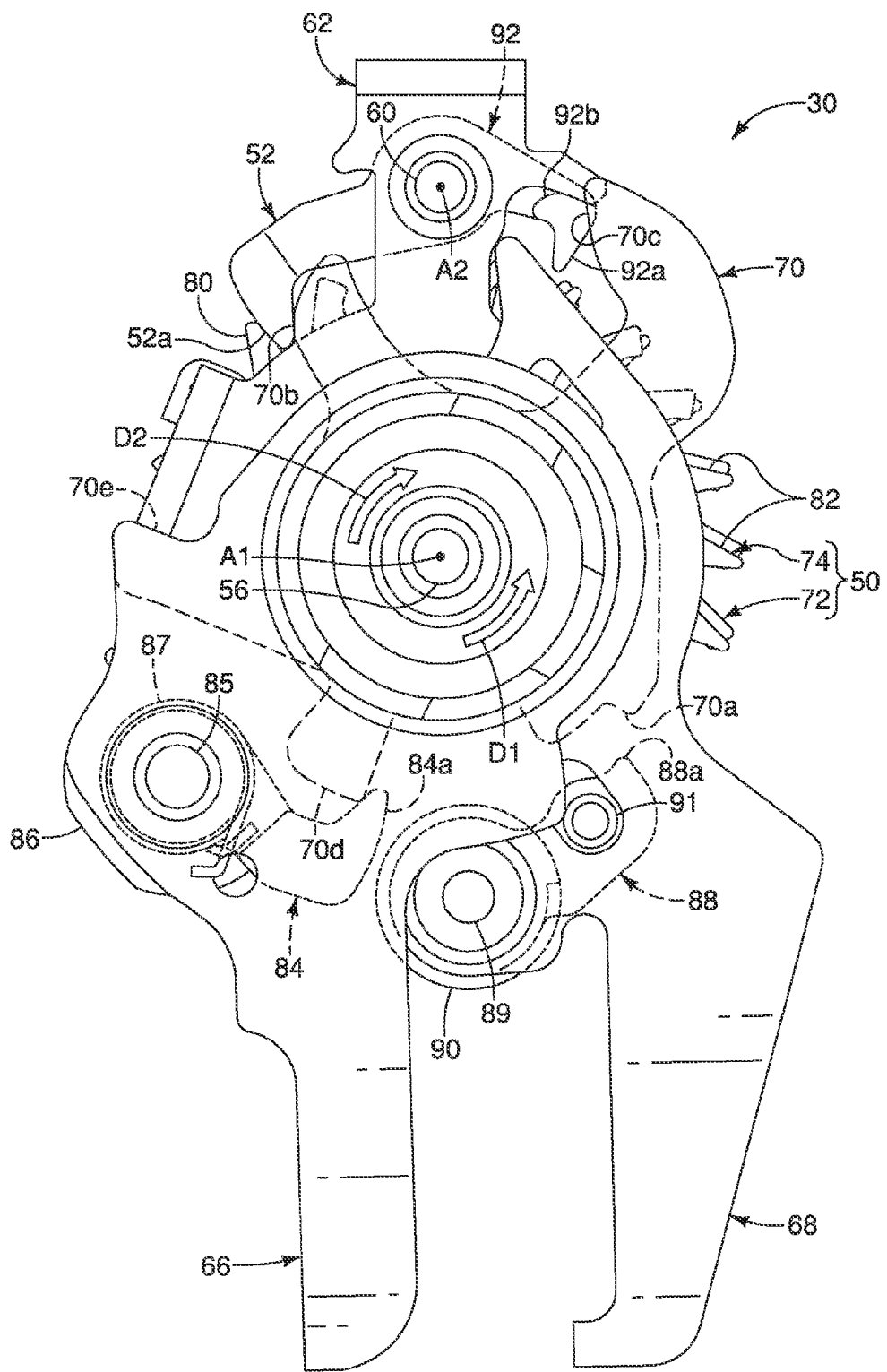
FIG. 14 is a front elevational view of selected parts (a positioning structure, a maintaining member, a stop member, a first operating member, a pulling pawl, a second operating member, a release member, a release pawl, a stationary support plate and a main support axle) of the bicycle component positioning unit illustrated in FIGS. 9 to 13 with the selected parts in their rest positions.

In the illustrated embodiment, as seen in FIGS. 14 and 15, the first operating member 66 includes a pulling pawl 84 that is pivotally mounted on the first operating member 66 by a pivot pin 85. The pivot pin 85 is supported at a first end by the first operating member 66 and at a second end by a support plate 86. The support plate 86 is rotatably mounted on the shaft 56b of the support axle 56. The pulling pawl 84 is configured and arranged to rotate the first and second positioning ratchets 72 and 74 such that the wire take-up member 64 rotates in the first direction D1. In particular, the pulling pawl 84 has an engagement tooth 84a that selectively engages one of the pulling teeth 81 when the first operating member 66 is rotated in the first direction D1.

A biasing element 87 is mounted on the pivot pin 85 for biasing the pulling pawl 84 about a center pivot axis of the pivot pin 85 such that the engagement tooth 84a is biased towards engagement with the positioning structure 50. Here, in the illustrated embodiment, the biasing element 87 is a torsion spring. The biasing element 87 has a coiled portion wrapped on the pivot pin 85, a first free end portion hooked onto the pulling pawl 84, and a second free end portion hooked onto the first operating member 66. In this way, the pulling pawl 84 is biased about the center pivot axis of the pivot pin 85 towards engagement with the pulling teeth 81. While the parts of the bicycle operating device 12 are in their rest positions, the engagement tooth 84a is arranged between adjacent tow pulling teeth 81 so as to be in a path of the pulling teeth 81.

In the illustrated embodiment, as seen in FIGS. 14 and 15, the second operating member 68 includes a release pawl 88 that is pivotally mounted on the second operating member 68 by a pivot pin 89. The release pawl 88 is configured and arranged to engage and rotate the release member 70 in the first direction D1 such that the first positioning ratchet 72 of the positioning structure 50 is released from the maintaining member 52 to rotate the wire take-up member 64 in the second direction D2. In particular, the release pawl 88 has an engagement tooth 88a that engages a peripheral edge of the release member 70 when the second operating member 68 is rotated in the first direction D1.

A biasing element 90 is mounted on the pivot pin 89 for biasing the release pawl 88 about a center pivot axis of the pivot pin 89 such that the engagement tooth 88a is biased towards engagement with the peripheral edge of the release member 70. Here, in the illustrated embodiment, the biasing element 90 is a torsion spring. The biasing element 90 has a coiled portion wrapped on the pivot pin 89, a first free end portion hooked onto the release pawl 88, and a second free end portion hooked onto the second operating member 68. In this way, the release pawl 88 is biased about the center pivot axis of the pivot pin 89 towards engagement with the peripheral edge of the release member 70.

As seen in FIG. 14, while the parts of the bicycle operating device 12 are in their rest positions, the engagement tooth 88a is held out of contact with the peripheral edge of the release member 70. In particular, the release pawl 88 has a control pin 91 fixed thereto. The control pin 91 extends from the release pawl 88 through an arcuate slot in the second operating member 68 such that the free end of the control pin 91 contacts the peripheral edge of the first operating member 66 while the parts of the bicycle operating device 12 are in their rest positions. In this way, the release pawl 88 is held out of engagement from the peripheral edge of the release member 70 by the first operating member 66. As a result, when the first operating member 66 is rotated in the first direction D1, a bushing on the pivot pin 89 and the control pin 91 both contact the peripheral edge of the first operating member 66 such that the second operating member 68 rotates with the first operating member 66 in the first direction D1. Since the first and second operating members 66 and 68 move together during the cable pulling operation (first shifting operation), the control pin 91 prevents the release pawl 88 from engaging the release member 70.

In the illustrated embodiment, the bicycle component positioning unit 30 of the bicycle operating device 12 further comprises a stop pawl 92 that is pivotally mounted on the pivot axle 60 between a non-stopping position and a stopping position. The stop pawl 92 has an engagement tooth 92a that is configured and arranged to selectively engage and disengage the stop teeth 82 to limit the rotational movement of the positioning structure 50 and the wire take-up member 64 in the second direction D2 during the cable releasing operation (second shifting operation). The stop pawl 92 is biased away from engagement with the stop teeth 82 by a biasing element 93. The biasing element 93 is a torsion spring. The biasing element 93 has a coiled portion that is wrapped around the pivot axle 60, a first free end portion engaged with the stop pawl 92, and a second free end portion that is hooked onto the second stationary support plate 62. In this way, the stop pawl 92 is biased about the center pivot axis of the pivot axle 60 by the biasing element 93 to be maintained out of the path of the stop teeth 82 while the parts of the bicycle operating device 12 are in their rest positions. As a result of this arrangement, the stop pawl 92 does not engage the positioning structure 50 during the cable pulling operation (first shifting operation). On the other hand, the stop pawl 92 has a projection 92b that is engaged by the release member 70 to pivot the stop pawl 92 so that the engagement tooth 92a moves into a path of the stop teeth 82 as the release member 70 is rotated in the first direction D1 during the cable releasing operation (second shifting operation).

Now the release member 70 will be discussed in more detail. As mentioned above, the release member 70 is rotated in the first direction D1 from the non-release position towards the release position as the second operating member 68 moves from a rest position to an actuated position in response to operation of the second user operating lever 28. Movement of the release member 70 in the first direction D1 moves the maintaining member 52 from the first position (maintaining position) to the second position (releasing position) so that the positioning structure 50 is released to move to another one of the predetermined positions. Movement of the release member 70 in the first direction D1 also moves the pulling pawl 84 out of the path of the pulling teeth 81 so that the positioning structure 50 and the wire take-up member 64 can rotate in the second direction D2 during the cable releasing operation. Further, the movement of the release member 70 in the first direction D1 also moves the stop pawl 92 that from the non-stopping position to the stopping position to limit rotational movement of the positioning structure 50 and the wire take-up member 64 in the second direction D2 during the cable releasing operation. In the illustrated embodiment, the release member 70 includes a release pawl abutment 70a, a first cam surface 70b, a second cam surface 70c, a pull pawl abutment 70d and a stop abutment 70e. In this embodiment, the release member 70 is a plate member. A peripheral edge of the release member 70 defines the release pawl abutment 70a, the first cam surface 70b, the second cam surface 70c, the pull pawl abutment 70d and the stop abutment 70e.

The release pawl abutment 70a is configured to be engaged by the engagement tooth 88a of the release pawl 88 when the second operating member 68 is moved from the rest position to the actuated position. In this way, the release member 70 is rotated in the first direction D1 from the non-release position towards the release position as the second operating member 68 moves from a rest position to an actuated position during the cable releasing operation.

The first cam surface 70b is configured to pivot the maintaining member 52 outward from the first position to the second position against the force of the biasing element 54 as the release member 70 rotates in the first direction D1 during the cable releasing operation. In this way, the maintaining member 52 releases the positioning structure 50 and the wire take-up member 64 to rotate in the second direction D2.

The second cam surface 70c is configured to pivot the stop pawl 92 inward from the non-stopping position to the stopping position against the force of the biasing element 93 as the release member 70 rotates in the first direction D1 during the cable releasing operation. In this way, the engagement tooth 92a of the stop pawl 92 moves into the path of the stop teeth 82 to limit the rotational movement of the positioning structure 50 and the wire take-up member 64 in the second direction D2 during the cable releasing operation. In other words, the engagement tooth 92a of the stop pawl 92 engages one of the stop teeth 82 while the release member 70 is in the release position. As a result, the positioning structure 50 and the wire take-up member 64 are prevented from rotating further in the second direction D2.

The pull pawl abutment 70d is configured to maintain the pulling pawl 84 from engaging the pulling teeth 81, while the parts of the bicycle operating device 12 are in their rest positions. In other words, the biasing element 87 biases the pulling pawl 84 so that the engagement tooth 84a contacts the pull pawl abutment 70e of the release member 70 such that the engagement tooth 84a is spaced from the pulling teeth 81, while the parts of the bicycle operating device 12 are in their rest positions. The pull pawl abutment 70d is further configured to maintain the pulling pawl 84 from engaging the pulling teeth 81 as the release member 70 rotates in the first direction D1 during the cable releasing operation. In particular, the pull pawl abutment 70e pushes the engagement tooth 84a of the pulling pawl 84 outward with respect to the rotational axis A1 as the release member 70 rotates in the first direction D1 during the cable releasing operation.

The stop abutment 70e contacts the second stationary support plate 62 while the release member 70 is in the rest position (non-release position). In particular, the biasing element 71 biases the release member 70 against the stop abutment 70e to establish a rest position of the release member 70. The biasing element 71 is provided between the second operating member 68 and the release member 70.

Figure 11:
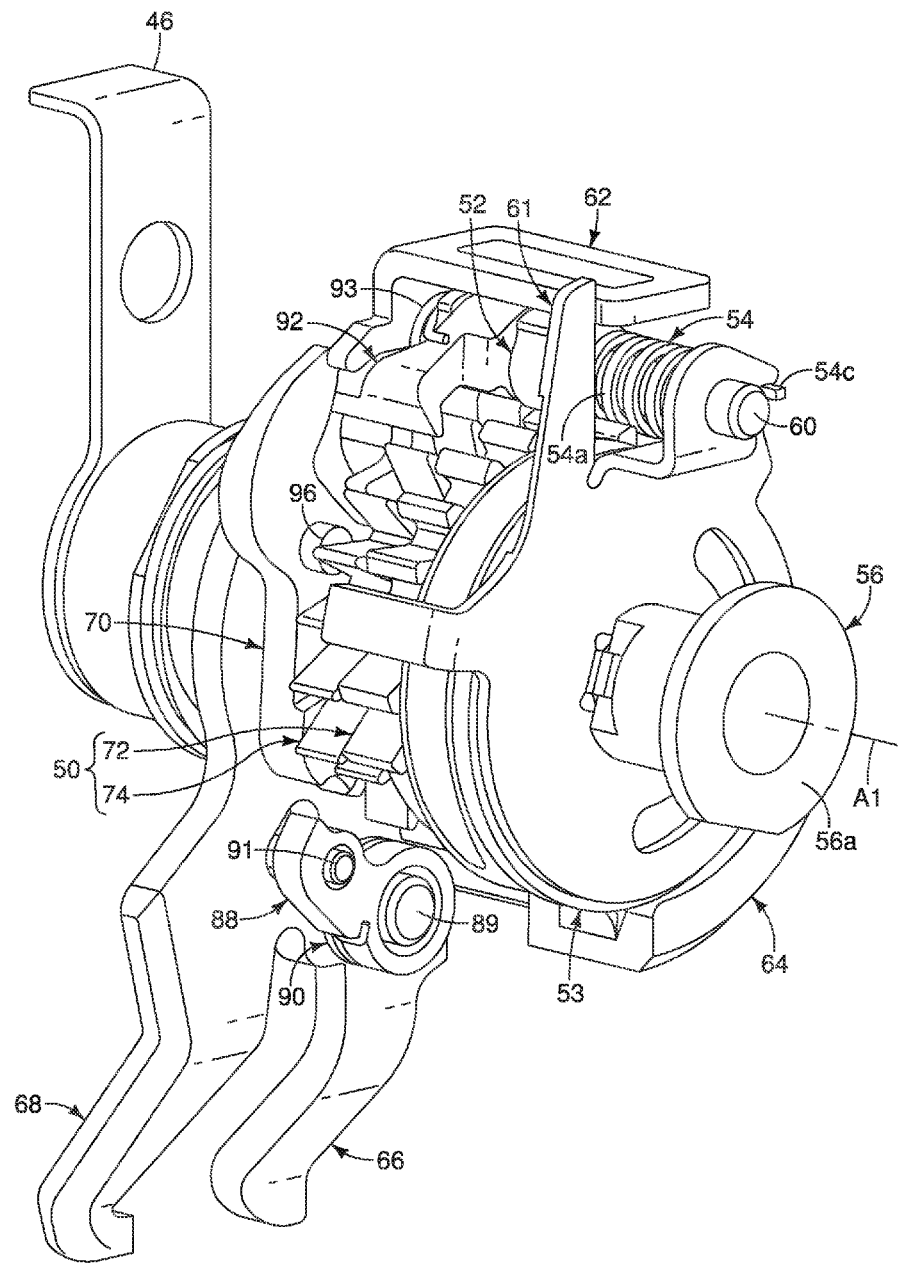
FIG. 11 is another rear perspective view of the bicycle component positioning unit illustrated in FIGS. 9 and 10 with the parts in their rest positions.
Figure 12:
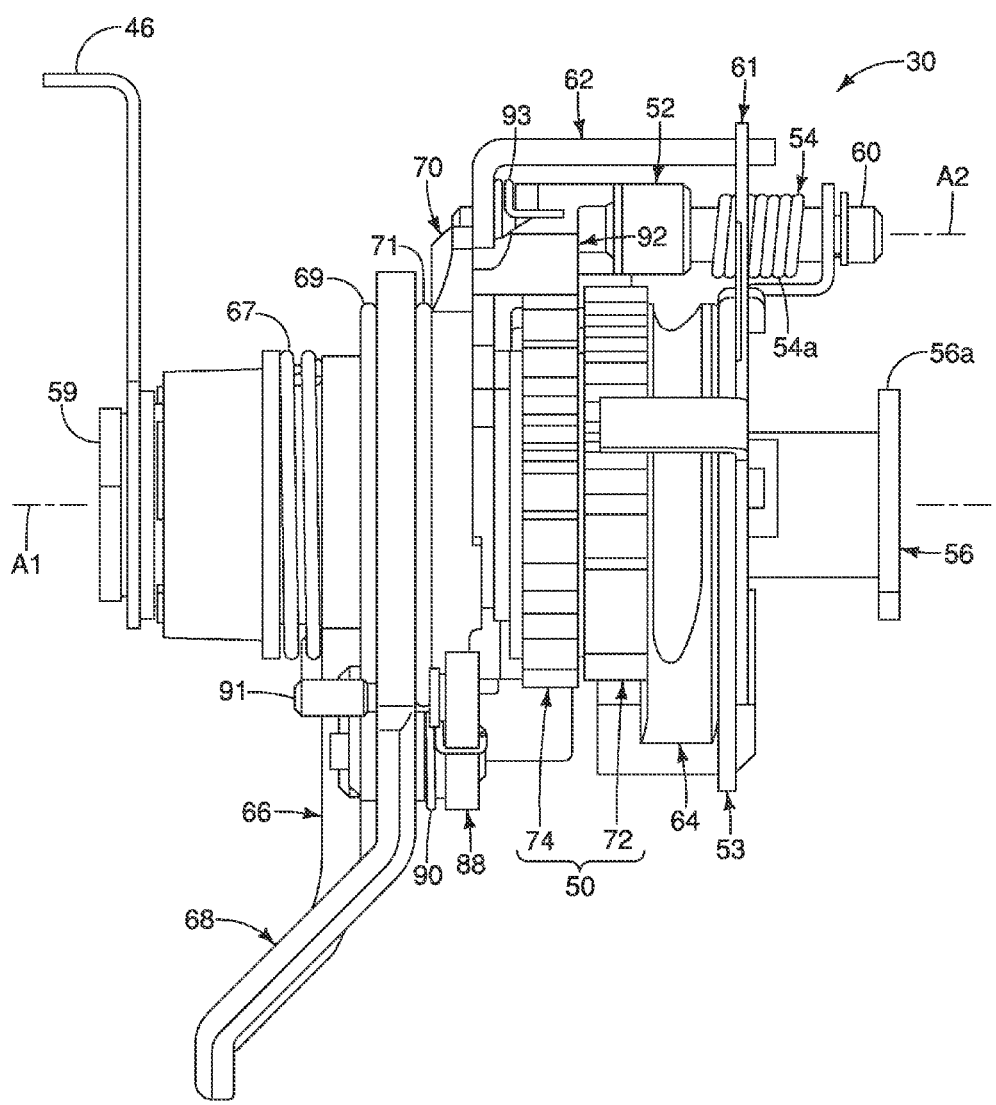
FIG. 12 is a first side elevational view of the bicycle component positioning unit illustrated in FIGS. 9 to 11 with the parts in their rest positions.
Figure 13:
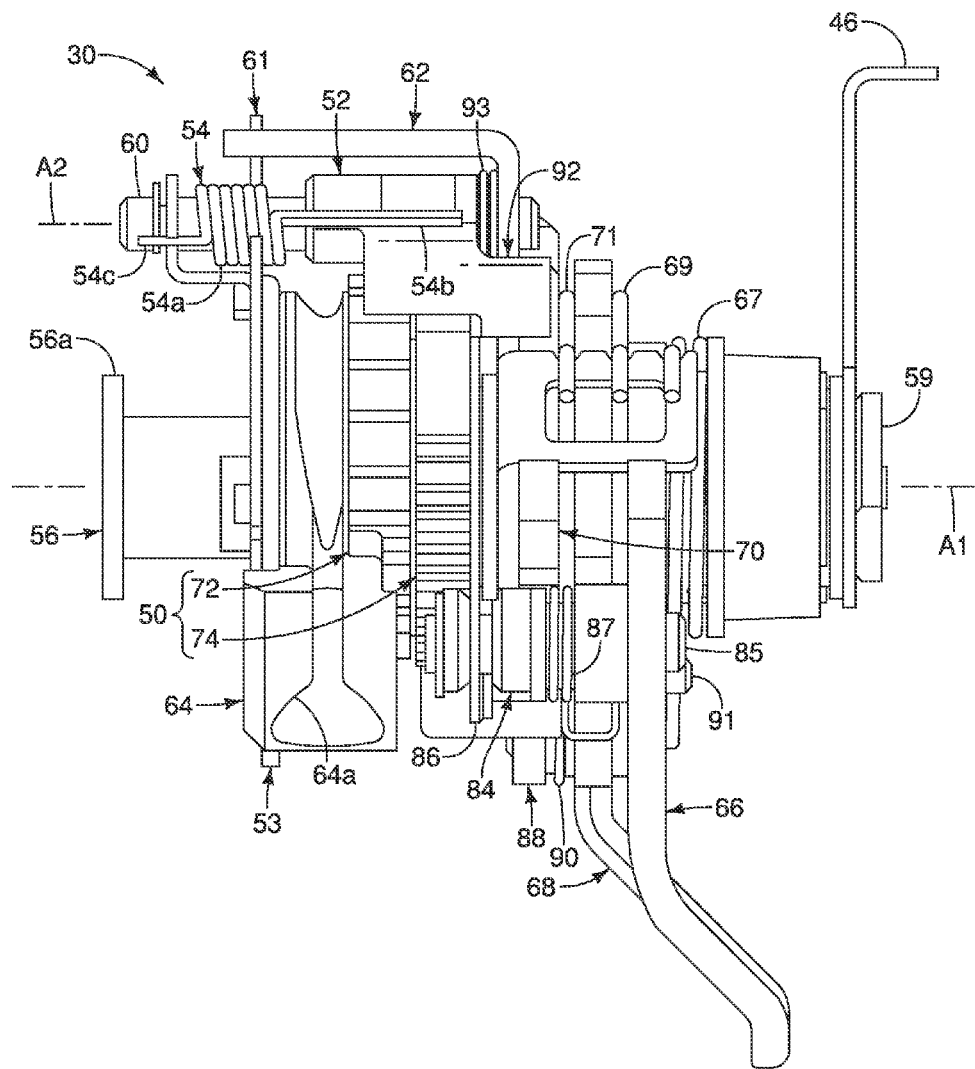
FIG. 13 is a second side elevational view of the bicycle component positioning unit illustrated in FIGS. 9 to 12 with the parts in their rest positions.

As seen in FIG. 11, the release member 70 further includes a stop pin 96 that projects in a direction parallel to the rotational axis A1 and towards the second stationary support plate 62. The stop pin 96 contacts the second stationary support plate 62 when the release member 70 is in the release position (actuated position). Thus, the stop pin 96 limits the rotational movement of the release member 70 in the first direction D1.

Referring now primarily to FIGS. 4, 5 and 15 to 22, a cable pulling operation is illustrated. In particular, as seen on FIGS. 4 and 5, the cable pulling operation (the first shifting operation) is performed by the rider pivoting the first user operating lever 26 about the shift pivot axis P2 in a direction S1 towards the bicycle longitudinal center plane. The abutment 26d of the first user operating lever 26 is arranged to contact the first operating member 66 as the first user operating lever 26 in moved in the direction S1. As a result, the first operating member 66 is pivoted in the first direction D1 about the rotational axis A1 by the first user operating lever 66.

Figure 21:
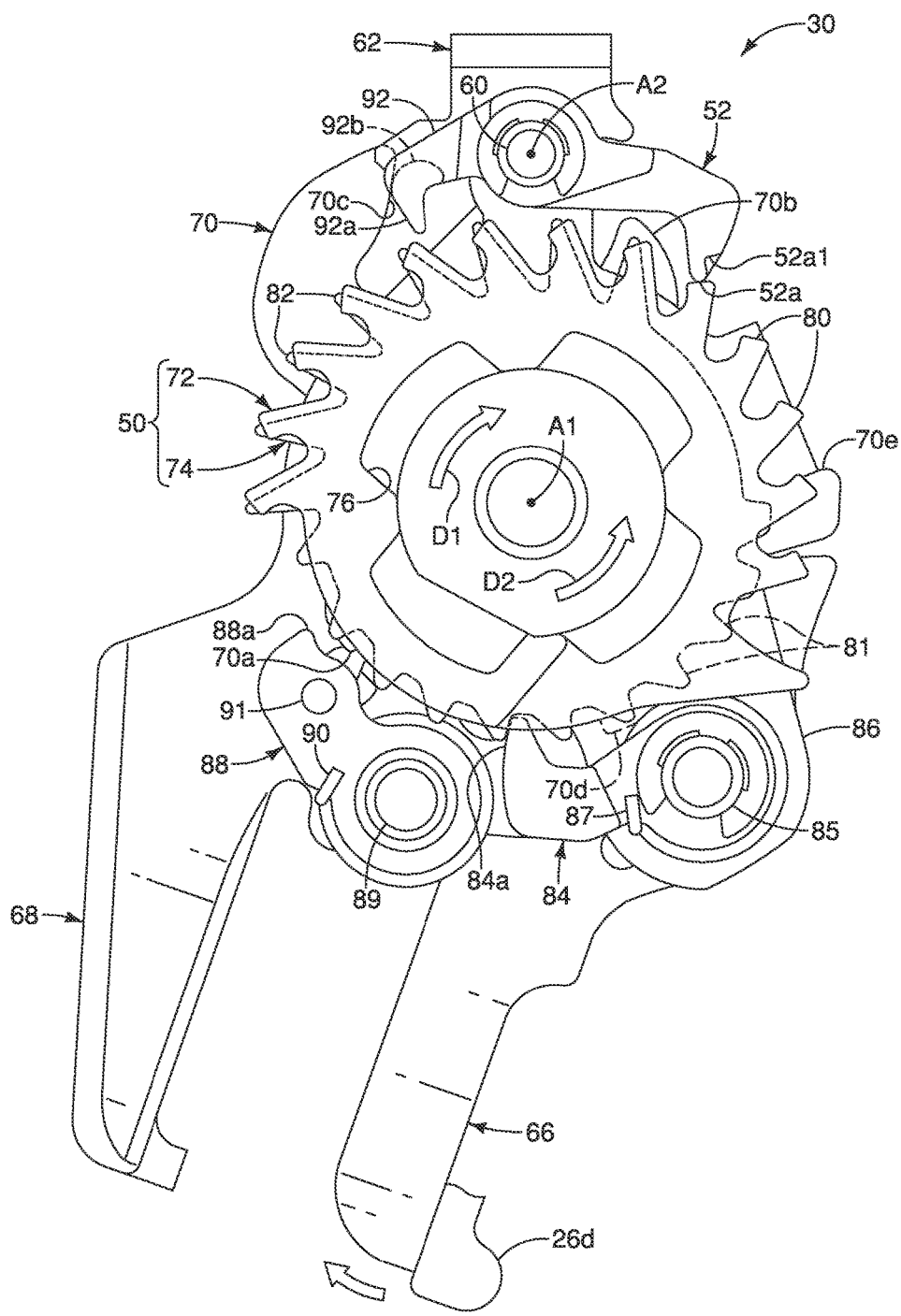
FIG. 21 is a rear elevational view, similar to FIGS. 15 and 20, of the selected parts of the bicycle component positioning unit but with the first operating member being pivoted further to move the maintaining member such that a rotating force is applied on the first positioning ratchet of the positioning structure by the maintaining member.
Figure 22:
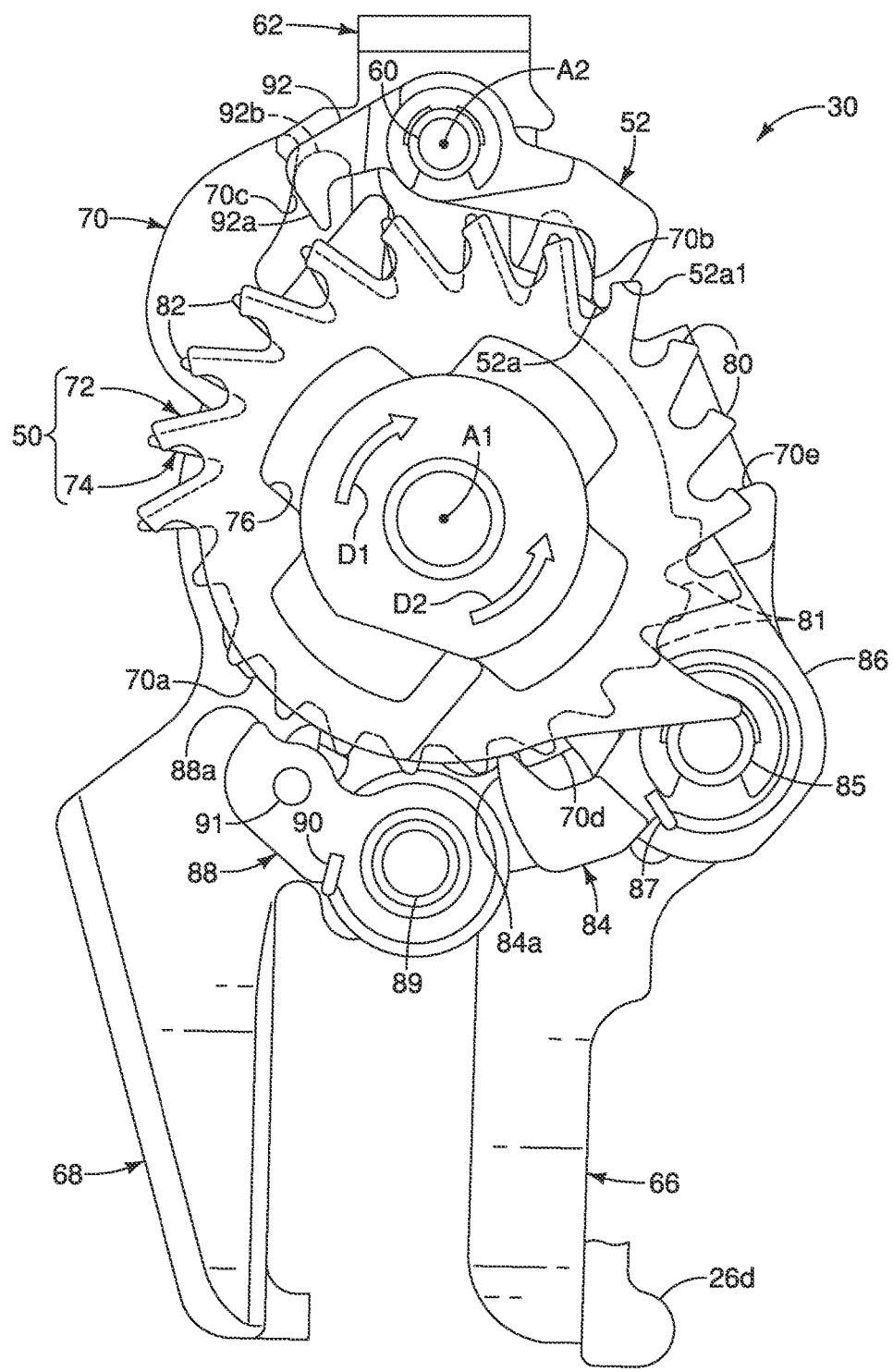
FIG. 22 is a rear elevational view, similar to FIGS. 15, 20 and 21, of the selected parts of the bicycle component positioning unit but with the first operating member returned to the rest position and the maintaining member engaged with a different positioning tooth from the positioning tooth that is engaged in FIG. 15.
Figure 23:
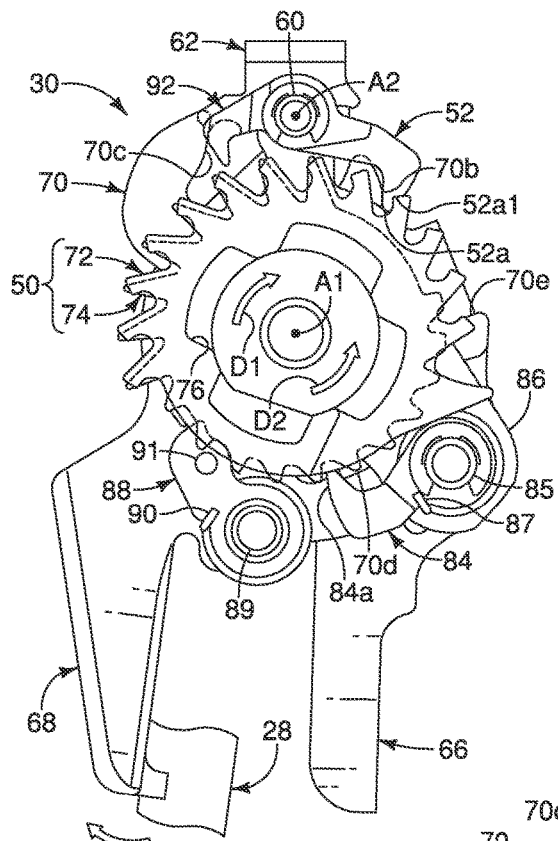
FIG. 23 is a rear elevational view, similar to FIG. 15, of the selected parts of the bicycle component positioning unit but with the second operating member being initially pivoted to start a cable releasing operation.
Figure 24:
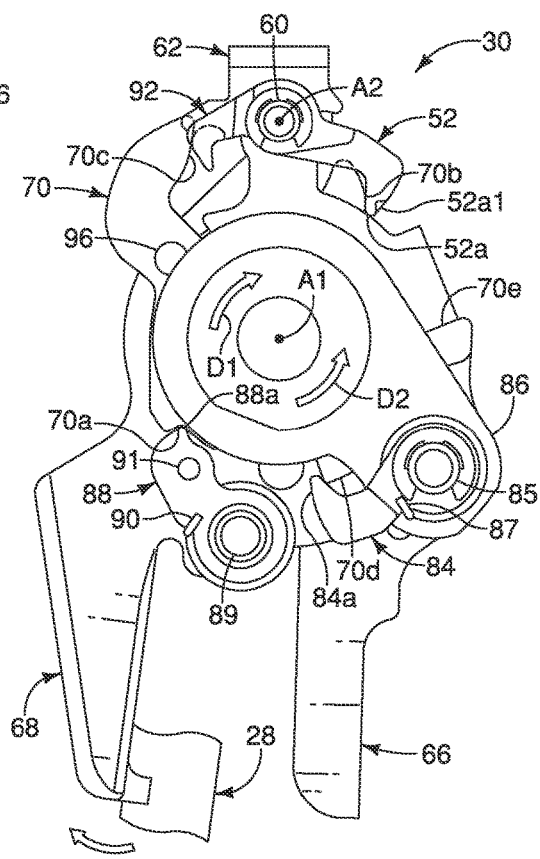
FIG. 24 is a rear elevational view, similar to FIG. 23, of the selected parts of the bicycle component positioning unit but with the first and second positioning ratchets removed to show the engagement of the release pawl with the release member.
Figure 25:
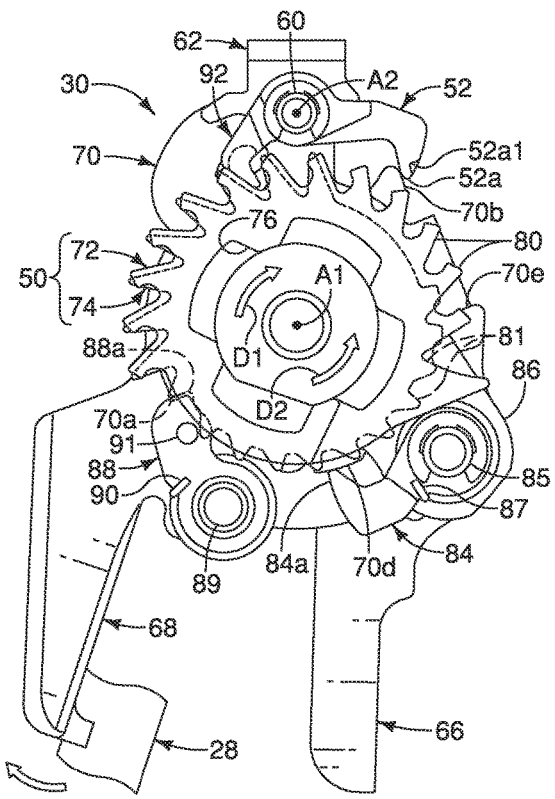
FIG. 25 is a rear elevational view, similar to FIGS. 15 and 22, of the selected parts of the bicycle component positioning unit but with the second operating member being pivoted further to move the release member such that the stop member is moved into the path of the stop teeth of the second positioning ratchet to limit rotational movement of the positioning structure in a cable releasing direction.
Figure 26:
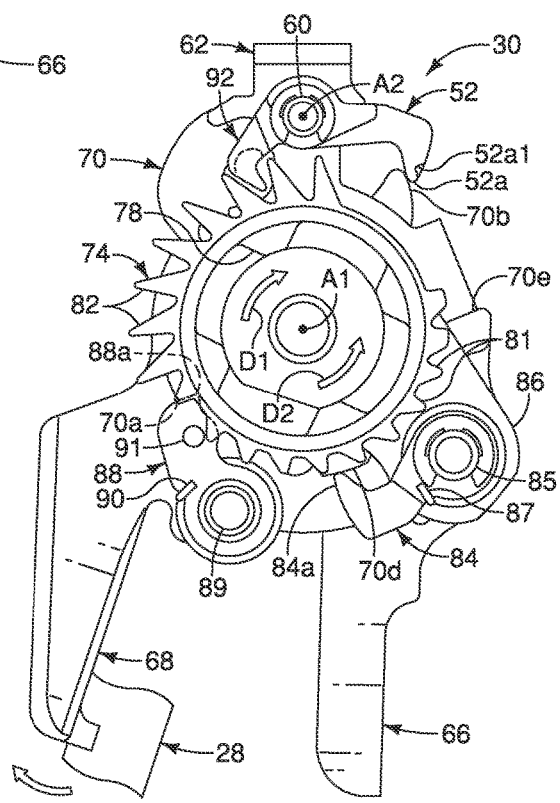
FIG. 26 is a rear elevational view, similar to FIG. 25, of the selected parts of the bicycle component positioning unit but with the first positioning ratchet removed to more clearly show the stop member in the path of the stop teeth of the second positioning ratchet.

As the first operating member 66 is pivoted in the first direction D1, the first operating member 66 abuts a bushing on the end of the pivot pin 89 so that the first and second operating members 66 and 68 pivot together. As seen in FIG. 20, during the pivotal movement of the first operating member 66 the first direction D1, the engagement tooth 84a of the pulling pawl 84 slides off the pull pawl abutment 70d of the release member 70, and engages of the pulling teeth 81 of the second positioning ratchet 74. Also, the maintaining member 52 is pivoted about the picot axis A2 by the cam portion 80c of one of the positioning teeth 80. Thus, as seen in FIG. 21, further pivotal movement of the first operating member 66 the first direction D1 causes the maintaining tooth 52a of the maintaining member 52 to engage the contact surface 80a1 of the protrusion 80a of one of the positioning teeth 80. In this position shown in FIG. 21, the biasing element 54 pushes the maintaining member 52 against the contact surface 80a1 of one of the positioning teeth 80 to apply a boost force on the first positioning ratchet 72 in the first direction D1. As a result, the wire take-up member 64, the first positioning ratchet 72 and the second positioning ratchet 74 all receive the boost force in the first direction D1. Thus, the wire take-up member 64, the first positioning ratchet 72 and the second positioning ratchet 74 are rotated by the force of the biasing element 54 acting on the contact surface 80a1 of one of the positioning teeth 80 so that the maintaining tooth 52a of the maintaining member 52 engages the next adjacent one of the positioning teeth 80 as seen in FIG. 22. In FIG. 22, the protrusion 80a of one of the positioning teeth 80 engages the recess 52a1 of the maintaining tooth 52a. In this way, the bicycle component positioning unit 30 is shifted by one shift position in the first direction D1.

Referring now to FIGS. 6, 7, 15 and 23 to 16, the cable releasing operation is illustrated. In particular, as seen on FIGS. 6 and 7, the cable releasing operation is performed by the rider pivoting the second user operating lever 28 about the shift pivot axis P2 in a direction S2 towards the bicycle longitudinal center plane. The second user operating lever 28 abuts the second operating member 68. As a result, the second operating member 68 is pivoted in the first direction D1 about the rotational axis A1 by the second user operating lever 28.

As the second operating member 68 is pivoted in the first direction D1, the engagement tooth 88a of the release pawl 88 engages the release pawl abutment 70a of the release member 70 to rotate the release member 70 in the first direction D1 about the rotational axis A1. As the release member 70 rotates in the first direction D1, the first cam surface 70b of the release member 70 pivots the maintaining member 52 out of the path of the positioning teeth 80 of the first positioning ratchet 72. Also as the release member 70 rotates in the first direction D1, the second cam surface 70c of the release member 70 pivot the stop pawl 92 into the path of the stop teeth 82 of the second positioning ratchet 74. In this way, the wire take-up member 64, the first positioning ratchet 72 and the second positioning ratchet 74 can rotate in the second direction D2 until one of the stop teeth 82 engages the stop pawl 92. Now, when the second user operating lever 28 is released, the second operating member 68 and the release member 70 return to their rest positions. Also the stop pawl 92 pivots out of the path of the stop teeth 82 of the second positioning ratchet 74 to release the wire take-up member 64, the first positioning ratchet 72 and the second positioning ratchet 74, while the maintaining member 52 simultaneously pivots back into engagement with one of the positioning teeth 80 of the first positioning ratchet 72. In this way, the bicycle component positioning unit 30 is shifted by one shift position in the second direction D2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
a positioning structure configured to be movable in a first direction and a second direction that is opposite the first direction; and
a maintaining member configured to move between a first position that maintains the positioning structure in one of a plurality of predetermined positions and a second position that releases the positioning structure to move to another one of the predetermined positions, the maintaining member contacting the positioning structure,
the positioning structure and the maintaining member being configured such that the maintaining member applies a rotating force on the positioning structure in the first direction as the maintaining member moves from the second position to the first position.

2. The bicycle operating device according to claim 1, wherein
the positioning structure is arranged to rotate about a rotational axis.

3. The bicycle operating device according to claim 2, wherein
the positioning structure includes a plurality of positioning teeth defining the predetermined positions; and
the maintaining member includes a maintaining tooth that selectively engages the positioning teeth to establish the predetermined positions, the maintaining member is biased such that the maintaining tooth contacts the positioning structure.

4. The bicycle operating device according to claim 3, wherein
at least one of the positioning teeth includes a contact surface, the maintaining tooth rides along the contact surface such that the maintaining tooth applies the rotating force on the positioning structure in the first direction as the maintaining member moves from the second position to the first position.

5. The bicycle operating device according to claim 4, wherein
the contact surface is configured to be substantially flat.

6. The bicycle operating device according to claim 5, wherein
the at least one of the positioning teeth includes a top portion, the contact surface is arranged at a second direction side with respect to the top portion, the contact surface has a slant angle with respect to a line extending from the rotational axis to the top portion between five degrees and sixty degrees.

7. The bicycle operating device according to claim 4, wherein
the at least one of the positioning teeth includes a top portion, the contact surface is arranged at a second direction side with respect to the top portion, the contact surface has a contact angle between one degree and six degree around the rotational axis.

8. The bicycle operating device according to claim 7, wherein
the contact surface is configured to be substantially flat.

9. The bicycle operating device according to claim 4, wherein the at least one of the positioning teeth includes a protrusion projecting in the second direction with respect to the rotational axis, the contact surface is provided on the protrusion.

10. The bicycle operating device according to claim 9, wherein
the maintaining tooth includes a recess; and
the protrusion is configured to be disposed in the recess of the maintaining tooth while the maintaining member is in the first position.

11. The bicycle operating device according to claim 3, wherein
the positioning teeth has a first tooth including a radial outermost tooth contact point and a second tooth including radial innermost tooth contact point facing the first tooth, the first tooth and the second tooth define a tooth angle between the radial outermost tooth contact point and the radial innermost tooth contact point between ten degrees and fourteen degrees around the rotational axis.

12. The bicycle operating device according to claim 1, further comprising:
a wire take-up member configured to rotate with the positioning structure; and
a first operating member movably arranged to rotate the positioning structure and the wire take-up member in the first direction as the first operating member moves from a rest position to an actuated position.

13. The bicycle operating device according to claim 12, further comprising:
a release member configured to be moved in the first direction from a non-release position towards a release position to selectively move the maintaining member between the first position and the second position; and
a second operating member movably arranged to move the release member in the first direction from the non-release position towards the release position as the second operating member moves from a rest position to an actuated position.

14. The bicycle operating device according to claim 13, wherein
the first and second operating members are configured as trigger levers that are biased towards the rest positions, respectively.

* * * * *